(12) United States Patent
Nagaoka et al.

(10) Patent No.: US 6,324,023 B1
(45) Date of Patent: Nov. 27, 2001

(54) POSITION DETECTOR AND LENS BARREL

(75) Inventors: Eiichi Nagaoka, Hyogo; Takushi Terasaka, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/485,761

(22) PCT Filed: Jun. 15, 1999

(86) PCT No.: PCT/JP99/03186

§ 371 Date: May 3, 2000

§ 102(e) Date: May 3, 2000

(87) PCT Pub. No.: WO99/66291

PCT Pub. Date: Dec. 23, 1999

(30) Foreign Application Priority Data

Jun. 15, 1998 (JP) .................................................. 10-166628

(51) Int. Cl.⁷ ................................. G02B 7/02; H03M 1/22
(52) U.S. Cl. .......................... 359/824; 359/822; 359/819; 341/10
(58) Field of Search .................................... 359/824, 822, 359/819; 341/10, 15

(56) References Cited

U.S. PATENT DOCUMENTS

| | | | |
|---|---|---|---|
| 4,959,574 | 9/1990 | Suzuki et al. | 360/109 |
| 5,231,541 | * 7/1993 | Han | 359/814 |
| 5,251,087 | 10/1993 | Sakashita et al. | 360/109 |
| 5,430,375 | 7/1995 | Inoue et al. | 324/207.21 |

FOREIGN PATENT DOCUMENTS

| | | |
|---|---|---|
| 58-153320 | 2/1982 | (JP) . |
| 62-157522 | 7/1987 | (JP) . |
| 1-203922 | 8/1989 | (JP) . |
| 2706776 | 8/1989 | (JP) . |
| 2-97617 | 8/1990 | (JP) . |
| 8-29660 | 7/1994 | (JP) . |

OTHER PUBLICATIONS

PCT WO99/66291 Dec. 23, 1999.
PCT/JP 99/03186 Jun. 15, 1998.
European Search Report dated Jul. 19, 2000 for EP 99 92 5330.

* cited by examiner

Primary Examiner—Georgia Epps
Assistant Examiner—Tim Thompson
(74) Attorney, Agent, or Firm—Ratner & Prestia

(57) ABSTRACT

A position detecting device comprises: a plurality of magnetoresistive elements which, with a predetermined spacing, are disposed so as to oppose a magnetic recording medium magnetized so as to have N poles and S poles at a predetermined pitch; and a holder for holding the magnetoresistive elements, the position detecting device detecting a moving amount of the magnetic recording medium by means of the magnetoresistive element, wherein the position detecting device further comprises positioning means for adjusting the spacing between the magnetic recording medium and the magnetoresistive elements, and wherein the holder is provided so as to be capable of pivoting around a center axis which is substantially parallel to a moving direction of the magnetic recording medium, so as to enable adjustment of the spacing between the magnetic recording medium and the magnetoresistive elements.

7 Claims, 21 Drawing Sheets

POSITION DETECTOR AND LENS BARREL

This application is U.S. National Phase Application of PCT International Application PCT/JP99/03186.

TECHNICAL FIELD

The present invention relates to a position detecting device for detecting the position of an object, and more specifically, relates to a position detecting device employing magnetoresistive (MR) elements which is suitable when high-resolution position detection is required, and relates to a lens barrel for a camera, video camera, or the like, incorporating such a position detecting device.

BACKGROUND ART

In general, a magnetoresistive (MR) element is an element which utilizes a phenomenon in which the application of magnetic flux to a thin film pattern of an iron-nickel alloy, a cobalt-nickel alloy, or the like changes its magnetoresistance. Position detecting devices incorporating this kind of magnetoresistive elements are widely used in conjunction with a magnetic recording medium (e.g., ferrite or plastic magnet) for enabling detection of the position of the magnetic recording medium. Specifically, a sinusoidal reproduction output can be obtained by utilizing the change in the magnetic flux due to the movement of the magnetic recording medium. By processing the output waveform, the relative or absolute position of the magnetic recording medium is obtained with a high accuracy. This kind of position detecting device is disclosed in Japanese Laid-open Publication No. 1-203922, for example, and a position detecting device which has a configuration as shown in FIG. 12 is widely implemented in apparatuses for consumer or industrial use.

FIG. 13 is a perspective view showing the general structure of a position detecting device incorporating a magnetoresistive element, and FIG. 14 is its front view. On the surface of a magnetic recording medium 201 is provided a magnetic pattern 202, which in magnetized so as to have N poles and S poles with a predetermined period $\lambda$. It has a structure such that a holder 204, which is integrally formed with magnetoresistive elements, is placed so as to oppose the magnetic recording medium 201 with predetermined spacing therefrom.

The operation principle of magnetoresistive elements is now explained with reference to FIGS. 15A through 15E. The change in the resistance of a magnetoresistive element in response to magnetic flux has the characteristics an shown in FIG. 15A, such that the resistance changes in proportion to the magnitude of the magnetic flux regardless the direction of the magnetic flux, and reaches saturation at a certain value. On a sensor face 205 of a holder 204, two magnetoresistive units R1 and R2 are disposed with an interval $\lambda/2$, which is equal to half of the period $\lambda$ of the magnetic pattern 202, or an electrical angle of 180° along the direction of movement of the magnetic recording medium 201.

Now, a case is considered where the magnetic recording medium 201 moves, and magnetic flux B whose magnitude changes in sinusoidal waves as shown in FIG. 15B is applied to the magnetoresistive units R1 and R2. If such magnetic flux B is applied to the magnetoresistive units R1 and R2, the resistance values of the magnetoresistive units R1 and R2 vary with the period $\lambda$, with a phase difference of $\lambda/2$ as shown in FIG. 15C.

Therefore, as shown in FIG. 15D, if these magnetorsistive units R1 and R2 are serially connected, and a voltage V in applied from a DC power supply 210, an output E1 can be obtained at a connection point 211. As shown in FIG. 15E, the output E1 is a sine wave output having the period $\lambda$.

Now, as understood from FIGS. 15A, 15B, and 15E, the amplitude of the sine wave output E1 increases or decreases corresponding to the amplitude of the magnetic flux B. This means that, if the spacing between the sensor face 205 and the magnetic recording medium 201 becomes wider, the amplitude of the magnetic flux B, which changes in accordance with the motion of the magnetic recording medium 201, becomes smaller, so that the sine wave output E1 also becomes smaller. In order to detect the position of the magnetic recording medium by processing the sine wave output E1, a high signal-to-noise ratio is required. Thus, it is necessary to increase the amplitude of the sine wave output E1. Therefore, it is necessary to decrease the distance between the sensor face 205 and the magnetic recording medium 201 so as to increase the amplitude of magnetic flux B.

At the same time, as seen from FIG. 15A, the resistance change of a magnetoresistive element saturates at a certain value. If the amplitude of the magnetic flux B is too large, the resistance of the magnetoresistive element reaches saturation. Therefore, the amplitude of sine wave output E1 can only increase so much. On the contrary, the saturation of the resistance change amount gives rise to an expanse of areas in which the resistance remains unchanged despite changes in the magnetic flux and the output E1 is distorted.

As is understood from the above, it is necessary to adjust the distance between the sensor face 205 and the magnetic recording medium 201 to a predetermined distance known as a reference gap amount in order to increase the amplitude of the sine wave output E1 while preventing distortion of the sine wave output E1.

The foregoing is a description of the principle of magnetic flux change detection. Now, a method for determining the moving direction of magnetic recording medium 201 will be explained, employing, four magnetoresistive units R1, R2, R3, and R4 shown in FIG. 16. The magnetoresistive units R3 and R4 are disposed with an interval of $\lambda/2$ along the moving direction of the magnetic recording medium 201, in a manner similar to the magnetoresistive units R1 and R2.

A pair of magnetoresistive units R3 and R4 are disposed with an interval of $\frac{1}{4}\lambda$, i.e., an electrical angle of 90°, with regard to the pair of magnetoresistive units R1 and R2, and electrically connected as shown in FIG. 17. Then, if a voltage V is applied from a DC power supply 210, a phase-A output Ea is obtained at an output terminal 212, and a phase-B output Eb is obtained at an output terminal 213. As shown in FIG. 18, the phase-A output Ea and the phase-B output Eb are shifted from each other by an electrical angle of 90° ($\frac{1}{4}\lambda$), so that their phases advance differently depending on whether the moving direction of magnetic recording medium 201 is positive or negative. Based on this, it is possible to determine the moving direction of the magnetic recording medium 201.

On the other hand, the amount of resistance change of a magnetoresistive element is as small as 2%. In an actual position detecting device, it is commonplace to dispose a plurality of the same phase magnetoresistive elements with the distance $\lambda$ in order to increase the amount of resistance change. That is, as shown in FIG. 19, eight magnetoresistive units R11, R12, R21, R22, R31, R32, R41, and R42 are used. Here, the magnetoresistive units R11 and R12 are disposed with the distance $\lambda$ along the moving direction of the magnetic recording medium 201, so as to be equivalent to the magnetoresistive unit R1 shown in FIG. 17. The pair of magnetoresistive units R11 and R12 and the pair of magnetoresistive units R21 and R22 are disposed with an interval of λ/2 so as to be equivalent to the magnetoresistive units R1 from R2 shown in FIG. 17.

The four magnetoresistive elements, i.e., the magnetoresistive units R11, R12, R21, and R22 and the magnetoresistive units R31, R32, R41, and R42 are disposed with an interval of ¼λ. The magnetoresistive elements disposed in such a pattern are equivalent to the electrical circuit of FIG. 17, and yet twice as much magnetoresistance change is obtained.

Among lens barrels used in cameras or video cameras and the like, a barrel is known in which the lens is moved by a linear motor when zooming or focusing. When moving the lens using such a motor, a separate position detecting means is required because the motor itself does not have position information. Therefore, methods are known which employ a position detecting device incorporating the aforementioned magnetoresistive element for detecting the position of a lens.

FIG. 20 shows a lens barrel structure employing such a linear motor. On an open face 120 located forward of a rear lens barrel 103 along the optical axis direction, a fixed lens frame 122 holding a compensation lens array 121, which is an array of fixed lenses, is attached, and a zooming lens array and a front lens barrel (not shown) are further disposed in this order along the optical axis direction.

Inside the rear lens barrel 103, a focusing lens 102 is held by a lens frame 101. The lens frame 101 is supported, by guide shafts 104a and 104b whose ends are affixed to the rear lens barrel 103 and the fixed lens frame 122, so as to be slidable along the optical axis direction (Z-axis direction).

The linear motor, which drives the lens frame 101 along the optical axis direction, includes the following stators: a driving magnet 105 which is magnetized perpendicularly to the moving direction (Z-axis direction), a C-shaped main yoke 106, and panel-like side yoke 107 provided on the rear lens barrel 103. The linear motor also includes, as moving portion, a coil 109 which is fixed on the lens frame 101 with a certain gap away from the driving magnet 105. When an electric current is applied to the coil 109, in a direction perpendicular to the magnetic flux generated by the driving magnet 105, the lens frame 101 is driven along the optical axis.

Next, a position detecting device will be described. FIG. 21 is a cross-sectional view taken along the line A—A in FIG. 20. The lens frame 101 includes a magnetic scale 111 formed of a magnetic recording medium such as ferrite. The surface of the magnetic scale 111 is alternately magnetized so as to have S poles and N poles with a pitch of 150 to 400 $\mu$m along the given optical axis direction (Z-axis direction), which is identical with the driving direction of the lens frame 101.

Moreover, the holder 112 in the position detecting device shown in FIG. 12 is held by the rear lens barrel 103, and a sensor face 113 which is formed of a magnetoresistive element opposes the magnetic scale 111 at a certain distance therefrom. When a pin 114 is inserted into a pivoting hole 117 (FIG. 20), the holder 112 can pivot around it. Therefore, a method is commonly used in which the spacing between the magnetic scale 111 and the sensor face 113 is adjusted by pivoting the holder 112, and thereafter the holder 112 is fixed by means of a screw 116 which is inserted into an elongated aperture 115 (FIG. 20).

However, in a position detecting device having the aforementioned structure, the step of adjusting the spacing between the magnetic scale 111 and the sensor face 113 and the step of fixing the holder 112 should be separately performed, thereby complicating the assembly of the apparatus, and thus causing an increase in the manufacturing cost.

Moreover, as described with reference to FIG. 15A, the spacing between the magnetic scale 111 and the sensor face 113 should be set at a predetermined distance which is known an the reference gap amount. As the spacing becomes wider than the reference gap amount, the output of the position detecting device drastically decreases; on the other hand, as the spacing becomes narrower, the output is distorted so that a sinusoidal reproduction output can no longer be obtained.

When the magnetization pitch of the magnetic scale 111 is 200 $\mu$m, for example, the reference gap amount should be set at around 100 $\mu$m. In this case, in order to enable highly accurate position detection based on the output of the position detecting device, the spacing between them should be set, for example, within about ±20 $\mu$m tolerance. The step of manually pivoting the holder 112 around the pin 114 and positioning the holder 112 within such a small tolerance is extremely difficult, and this has been causing a further increase in the manufacturing cost.

Furthermore, given the processing accuracy, there is a gap of 10 $\mu$m or more between the pin 114 and the pivoting hole 117 in which the pin 114 is inserted. Thus, when the holder 112 is intended to be pivoted around the pin 114, the holder 112 may often be translated along the gap with respect to the pivoting hole 117. Therefore, it has been difficult to make a fine adjustment on the order of 10 $\mu$m.

The following methods are known to provide a constant gap between a magnetoresistive element and a magnetic recording medium without performing such an adjustment.

A position detecting device disclosed in Japanese Laid-open Publication No. 62-157522 is characterized by using a thin flexible film for setting the spacing between a magnetic recording medium and a magnetoresistive element. A position detecting device disclosed in Japanese Utility Model Laid-open Publication No. 2-97617 is configured so that a magnetoresistive element is fitted in a resin or metal holder, and the spacing between a magnetoresistive element and a magnetic recording medium is set by allowing a projection extruding from the holder to abut the magnetic recording medium.

In these conventional technique, the spacing between magnetoresistive element and the magnetic recording medium is physically bridged through a thin film or a projection, so that, the spacing between the magnetic recording medium and the magnetoresistive element can be set in the vicinity of a certain width by simply attaching the magnetoresistive element.

In these conventional techniques, however, the output of the driving means for driving the moving portion should be enhanced because the moving portion must move while maintaining physical contact. Particularly in the case of a lens barrel, where a light-weight moving portion having a weight of only 1 to 2 g is driven, the friction force generated due to the physical contact of the position detecting device becomes extremely large compared to the weight of the moving portion. In order to move the moving portion against such friction force, the linear motor for driving it must be increased in size. As a result, there has been a problem in that only a lens barrel having a quite large overall size can be provided.

Moreover, in the conventional example described with reference to FIG. 20, where the holder 112 is affixed by the screw 116 which is inserted into the elongated aperture 115, there is a disadvantage in that the holder 112 has such a large configuration that the area occupied by the holder 112 along the width direction (X-axis direction) of the barrel increases, thereby hindering downsizing of the apparatus.

Furthermore, the magnetic scale 111 and the sensor face 113 are not always in parallel because the holder 112 is pivoted around the pin 114, so that the spacing between them varies along the optical axis direction (Z-axis direction). If the spacing between the magnetic scale 111 and the sensor face 113 varies along the optical axis direction (i.e. the moving direction of magnetic scale 111) in this manner, there is a disadvantage in that the output characteristics of the position detecting device deteriorate, as described below.

Usually, magnetoresistive elements consist of eight magnetoresistive units R11 through R42, as shown in FIG. 19. In addition, the magnetoresistive units R11 through R42 should be disposed in a certain pattern so as to be at certain distances from each other, along the moving direction of the magnetic recording medium 201 (i.e., the magnetic scale 111). The sensor face 113 of the holder 112 shown in FIG. 12 is also provided with similar magnetoresistitve units R11 through R42.

As is understood from FIG. 19, the distance from the magnetoresistive units R11 to R42 is 2.75 times the magnetization period $\lambda$ of the magnetic scale 111. In the case where $\lambda=200\,\mu m$, which exemplifies a typical magnetization period of the magnetic scale 111, the distance from the magnetoresistive units R11 to R42 is 550 $\mu m$.

Suppose the sensor face 113 has tilted by $\theta=5°$ with respect to the magnetic scale 111 around the Y-axis as a result of an adjustment by pivoting the holder 112 around the pin 114, as shown in FIG. 22. In this case, there is as much as a 50 $\mu m$ difference between the distance S1 from the magnetoresistive unit R11 to the magnetic scale 111 and the distance S4 from the magnetoresistive unit R42 to the magnetic scale 111. When the magnetization pitch of the magnetic scale 111 is 200 $\mu m$, the reference gap amount should be set at around 100 $\mu m$. Therefore, the spacing for the magnetoresistive unit R11 differs from the spacing for the magnetoresistive unit R42 by nearly half the reference gap amount.

As described with reference to FIG. 15A, the amount of resistance change of the magnetoresistive element varies depending on the magnitude of magnetic flux, in other words, the spacing between the magnetic scale 111 and the magnetoresistive units R11 through R42. In the vicinity of the portion of the magnetoresistive unit R11, the spacing is narrower than the reference gap amount, so the resistance change of R11 is distorted. On the other hand, in the vicinity of the magnetoresistive unit R42, the spacing is wider than the reference gap amount, so the amplitude of the resistance change is small.

If the spacing between the magnetoresistive elements and the magnetic scale 111 varies along the moving direction of magnetic scale 111 in this manner, the amount of resistance change varies for each of the magnetoresistive elements which are disposed in a certain pattern and at a certain distance to each other. Therefore, even if the spacing is adjusted equal to the reference gap amount in the center, the A-phase output Ea and the B-phase output Eb shown in FIGS. 17 and 18 may have distorted waveforms, or the amplitudes of A-phase output Ea and B-phase output Eb may be different, or the phase difference between them (¼$\lambda$) may vary.

The resolution and accuracy of position detecting devices are becoming increasingly important in recent years. For example, as for lens barrels used for cameras or video cameras, etc., the trend for downsizing, lighter weight, and higher performances of the products give rise to the need for developing smaller lens barrels having better optical characteristics. In order to downsize a lens barrel or improve the optical characteristics (such as resolution) of a lens, it is necessary to position the lens with a higher accuracy upon zooming or focusing. Therefore, the resolution and accuracy of the position detecting device need to be enhanced correspondingly. Therefore, there is a need for obtaining an accuracy of about 1 $\mu m$, which is much smaller than the magnetization period $\lambda(=200\,\mu m)$ of the magnetic scale 111, by subjecting the A-phase output Ea and B-phase output Eb to complicated processing.

In order to secure such a high position detection accuracy, the waveform accuracy of A-phase output Ea and B-phase output Eb becomes quite important. That is, if the waveforms are distorted, or they differ in amplitude, or the phase difference between these outputs varies, the accuracy of the position detection is decreased.

In the position detecting device having the configuration described with reference to FIGS. 12, 20 and 21, the sensor face 113 may tilt with respect to the magnetic scale 111 as shown in FIG. 22 at the time of adjusting the spacing between magnetic scale 111 and sensor face 113. Therefore, there has been a problem in that the spacing between the magnetic scale 111 and the sensor face 113 varies along the moving direction of magnetic scale 111, and the accuracy of the waveforms at A-phase output Ea and B-phase output Eb is deteriorated, thereby making it impossible to secure high resolution and accuracy.

DISCLOSURE OF THE INVENTION

A position detecting device according to the present invention comprises a plurality of magnetoresistive elements which, with a predetermined spacing, are disposed so an to oppose a magnetic recording medium magnetized so as to have N poles and S poles at a predetermined pitch; and a holder for holding the magnetoresistive elements, the position detecting device detecting a moving amount of the magnetic recording medium by means of the magnetoresistive element, wherein the position detecting device further comprises positioning means for adjusting the spacing between the magnetic recording medium and the magnetoresistive elements, and wherein the holder is provided so as to be capable of pivoting around a center axis which is substantially parallel to a moving direction of the magnetic recording medium, so as to enable adjustment of the spacing between the magnetic recording medium and the magnetoresistive elements. As a result, the aforementioned goals are achieved.

The holder may comprise a projecting member; the projecting member may comprise a curved face centered around the center axis; and the curved face may have substantially a constant curvature.

The holder may be attached on a receptacle member, and the positioning means may comprise: an elastic member for applying elastic force to the holder in a direction for causing changes in the spacing; and a screw for screwing together the holder and the receptacle member; the holder may include an attachment hole for inserting the screw therethrough; the receptacle member may comprise a screw boss corresponding to the screw, the screw may be screwed into the screw boss against an elastic force of the elastic member, whereby the spacing between the magnetic recording medium and the magnetoresistive elements may be adjusted.

The positioning means may be provided on the opposite side of the magnetoresistive elements from the center axis.

The holder may comprise a projecting member; the projecting member may comprise a curved face centered around the center axis; and the curved face may have a substantially constant curvature; the holder may be attached on the receptacle member; and the positioning means may comprise: an elastic member for applying elastic force to the holder in a direction for causing changes in the spacing; and a screw for screwing together the holder and the receptacle member; wherein the holder may comprise an attachment hole for inserting the screw therethrough; the receptacle member may comprise an abutment surface which is substantially parallel to the moving direction of the magnetic recording medium; and the elastic member may be provided in a position shifted from the attachment hole toward the center axis, so that a moment for pressing the curved face against the abutment surface is generated.

A lens barrel according to the present invention comprises: a barrel; a guide axis supported by the barrel; a plurality of moving lens which move along the optical axis direction along the guide axis; lens holding means for holding the moving lens, the lens holding means being provided so as to movable in an optical axis direction along the guide axis; and driving means for driving the lens holding means along the optical axis direction, wherein: the lens holding means comprises a magnetic recording medium which is magnetized so as to have N poles and S poles at a predetermined pitch; and the lens barrel further comprises a position detecting device for detecting the moving amount of the magnetic recording medium; the position detecting device comprises: a plurality of magnetoresistive elements which, with a predetermined spacing, are disposed so as to oppose a magnetic recording medium; a holder for holding the magnetoresistive elements; and positioning means for adjusting the spacing between the magnetic recording medium and the magnetoresistive elements, wherein the holder is attached so as to be capable of pivoting around a center axis which is substantially parallel to a moving direction of the magnetic recording medium, so as to enable adjustment of the spacing between the magnetic recording medium and the magnetoresistive elements. As a result, the aforementioned goals are achieved.

The holder may be attached to the barrel; and the positioning means may comprise: an elastic member for applying an elastic force to the holder in a direction for causing changes in the spacing; and a screw for screwing together the holder and the receptacle member; and wherein the holder may comprise an attachment hole for inserting the screw therethrough; the barrel may comprise a screw boss corresponding to the screw, and wherein: the lens holding means may comprise a reinforced projecting member having an escape hole; and the escape hole may be formed so that the screw boss and the lens holding means do not interfere with each other.

According to one aspect of the present invention, when the holder is attached to the receptacle member by the positioning means, the holder pivots around the center axis of the curved surface of the projecting portions, so that it is possible to adjust the spacing between the magnetic recording medium and the magnetoresistive elements.

According to another aspect of the present invention, by inserting the screw in the receptacle member against the biasing force of the elastic member, it is possible to position the holder, and concurrently adjust the spacing between the magnetic recording medium and the magnetoresistive elements with a high accuracy.

According to still another aspect of the present invention, it is possible to keep the spacing between the magnetoresistive elements and the magnetic recording medium constant along the moving direction of the magnetic recording medium, and excellent output characteristics are obtained, so that a highly accurate position detecting is made possible. Moreover, by placing the positioning means at on the opposite side of the magnetoresistive elements from the projecting portions, it is possible to perform an adjusting process easily and quickly, and it is also possible to provide a compact position detecting device.

According to still another aspect of the present invention, it is possible to provide a lens barrel smaller than conventional ones.

Thus, the invention described herein makes possible the advantages of (1) providing a position detecting device which allows for easy assembly and adjustment processes and which permits an easy and highly accurate adjustment of the spacing between a magnetic recording medium and a sensor face, as well as a lens barrel incorporating the same; and (2) providing a position detecting device which is capable of retaining a constant spacing between magnetoresistive elements and a magnetic recording medium along the moving direction of the magnetic recording medium, capable of achieving excellent output characteristics, and capable of providing high position detecting accuracy, and which is also small, as well as a lens barrel incorporating the same.

BEST MODES FOR CARRYING OUT THE INVENTION

Hereinafter, a position detecting device according to the present invention and a lens barrel incorporating the same will be described by way of illustrative examples with reference to the accompanying FIGS. 1 through 11.

Figure 1:
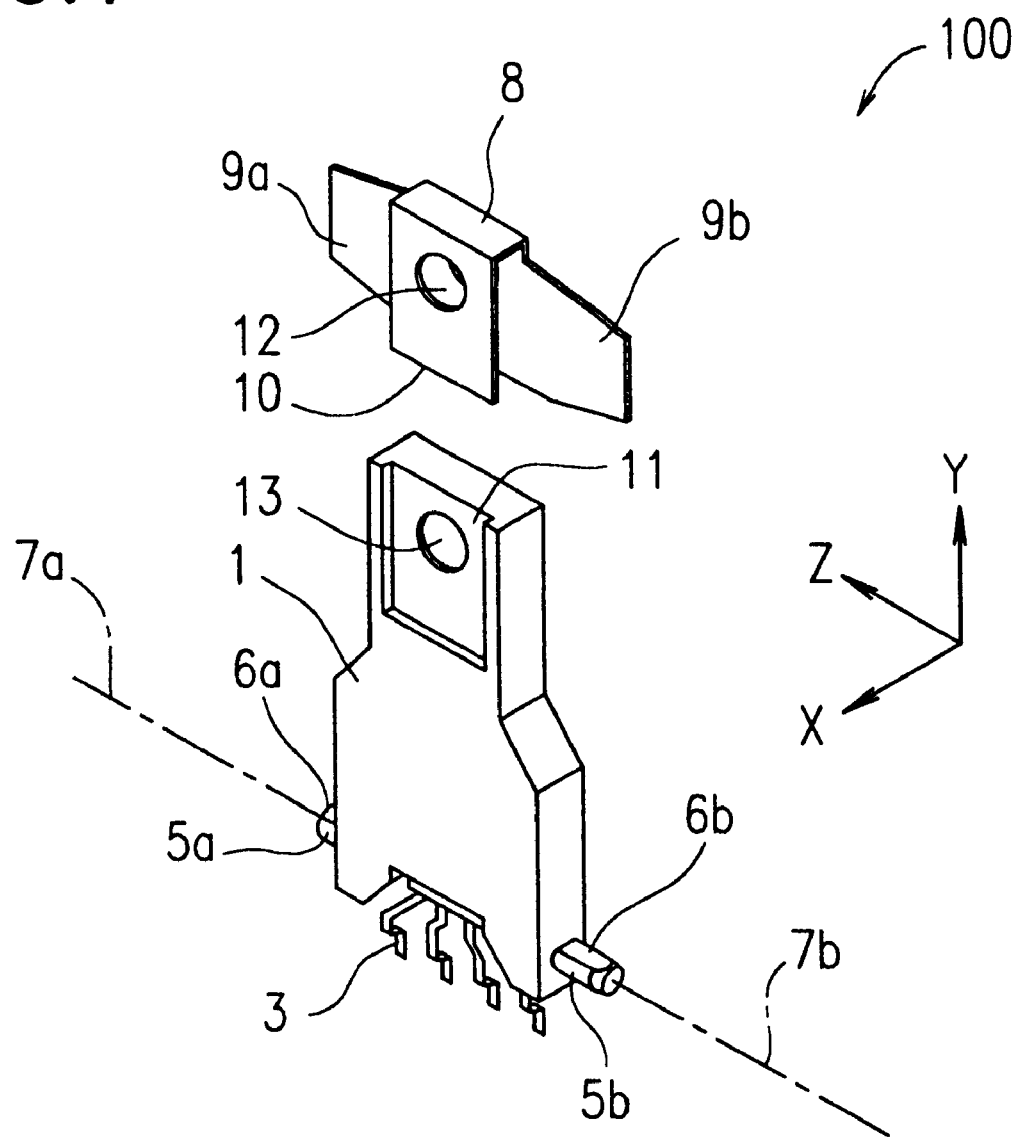
FIG. 1 is a perspective view showing a position detecting device according to an example of the present invention.
Figure 2:
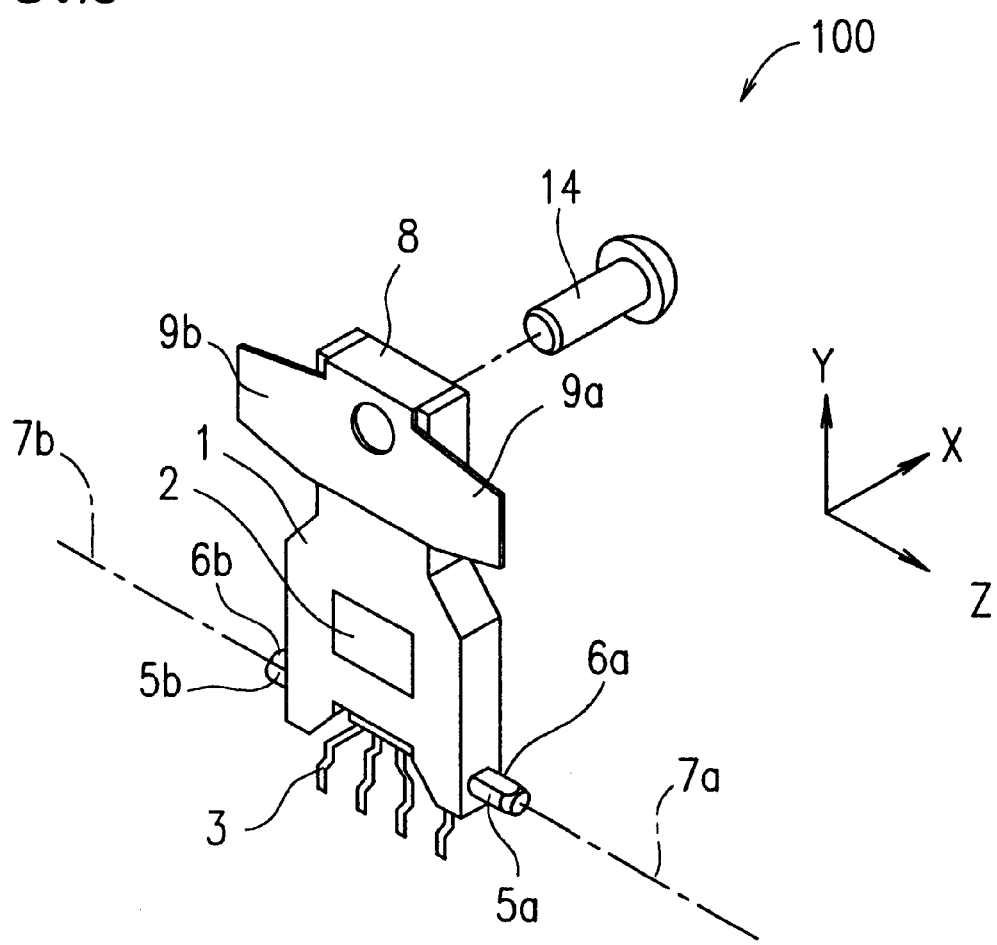
FIG. 2 is a perspective view showing a position detecting device according to an example of the present invention.
Figure 3:
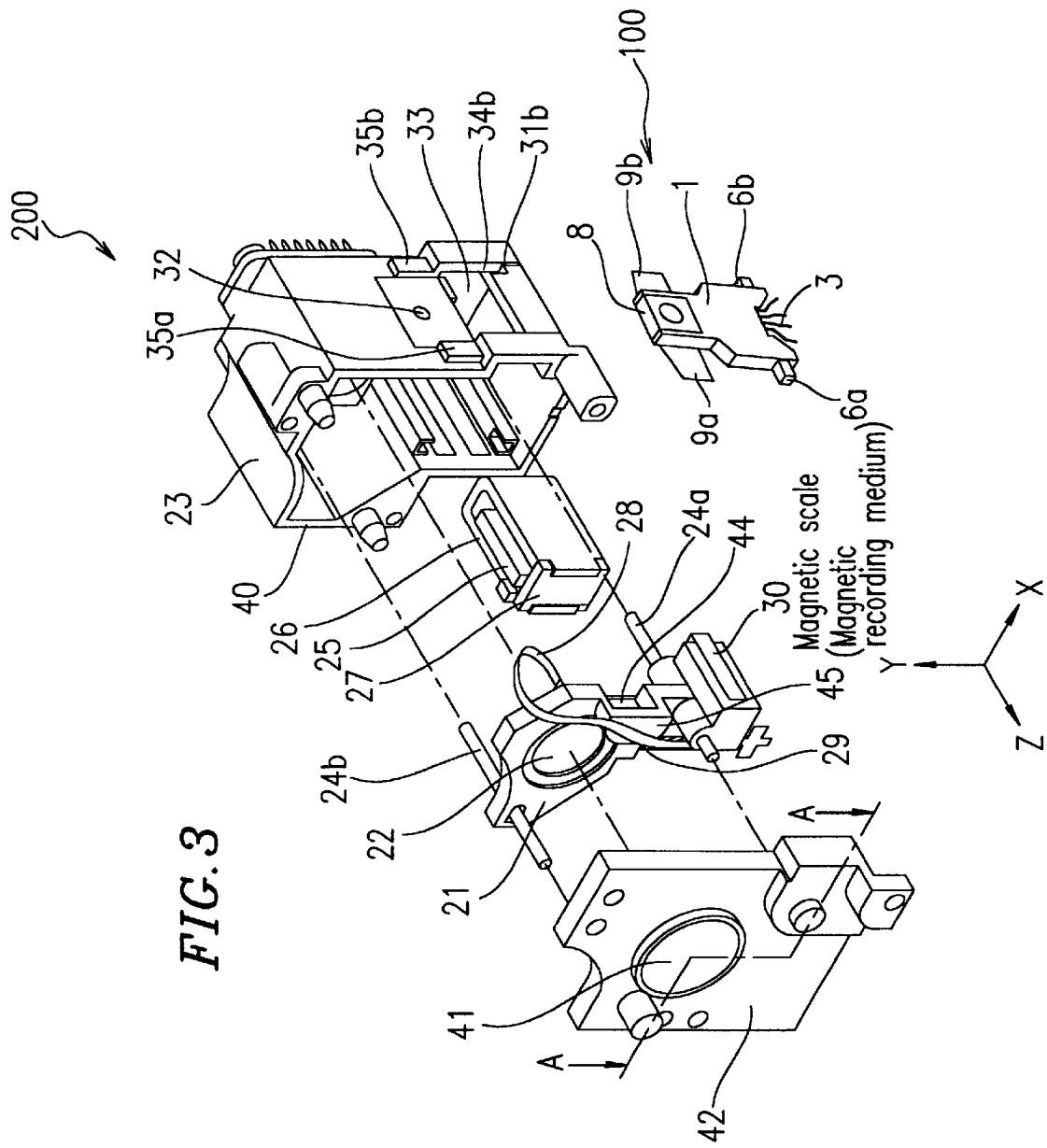
FIG. 3 is an exploded perspective view showing a lens barrel according to an example of the present invention.
Figure 4:
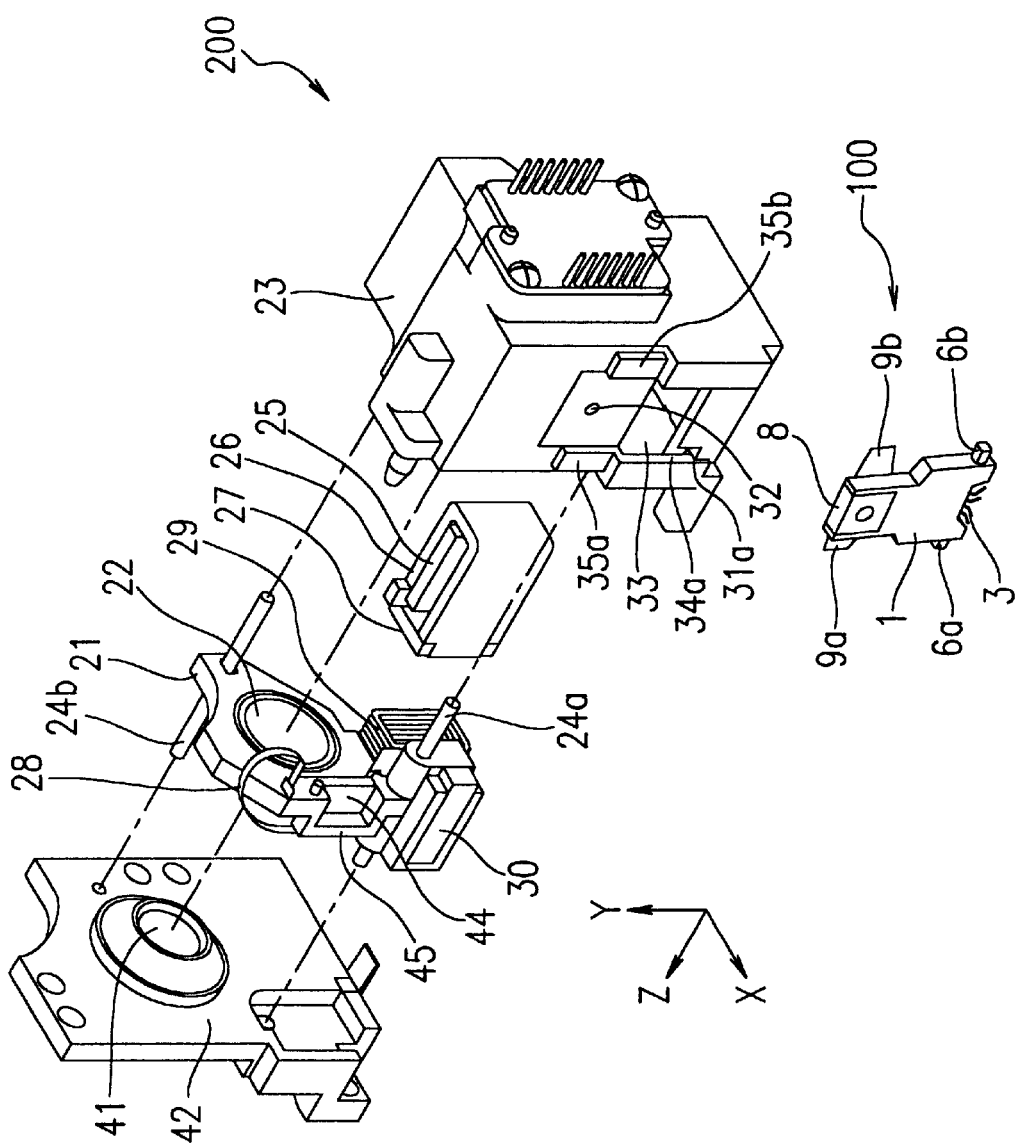
FIG. 4 is an exploded perspective view showing a lens barrel according to an example of the present invention.
Figure 5:
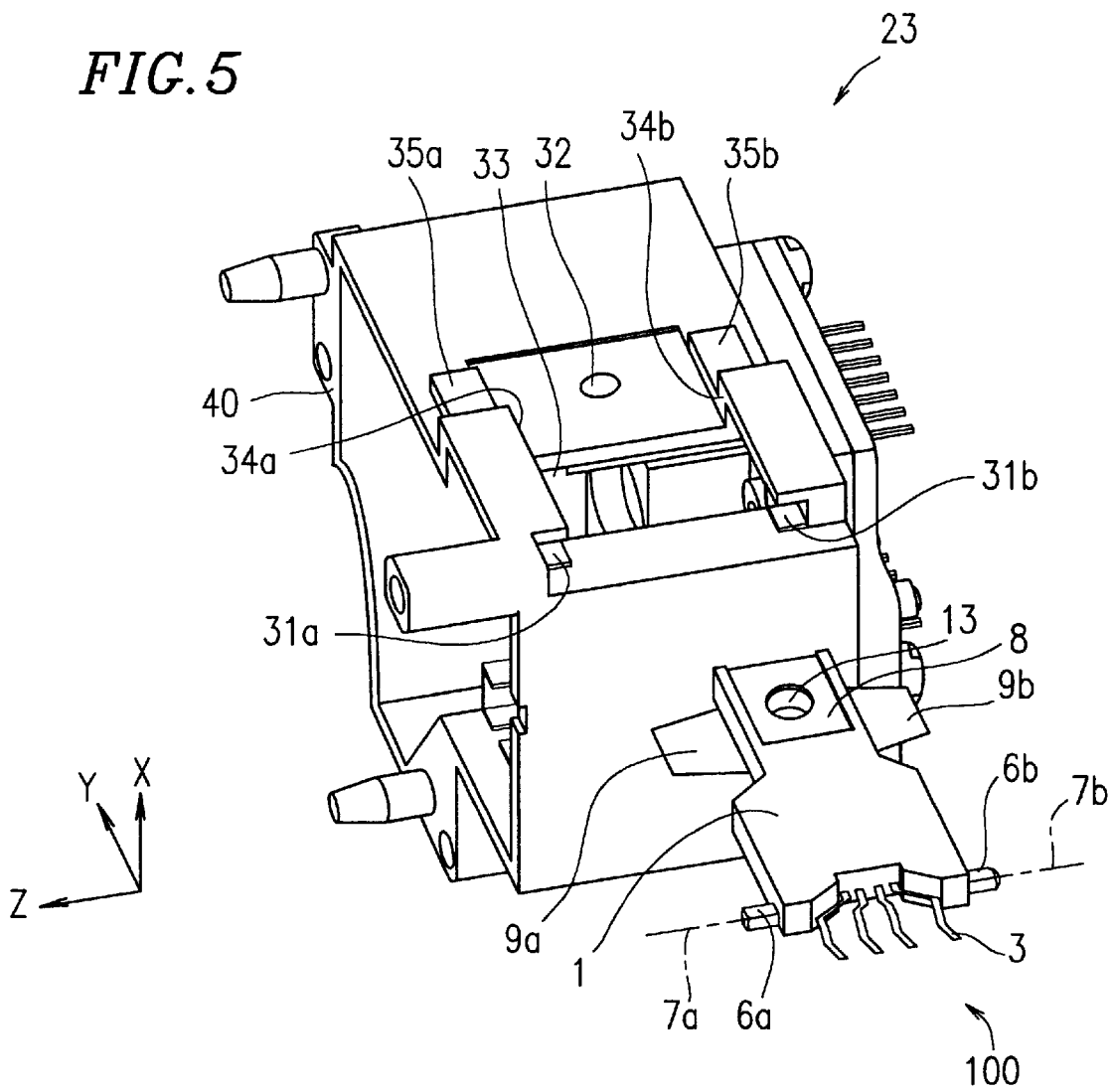
FIG. 5 is an exploded perspective view showing a portion of the lens barrel according to an example of the present invention.
Figure 6:
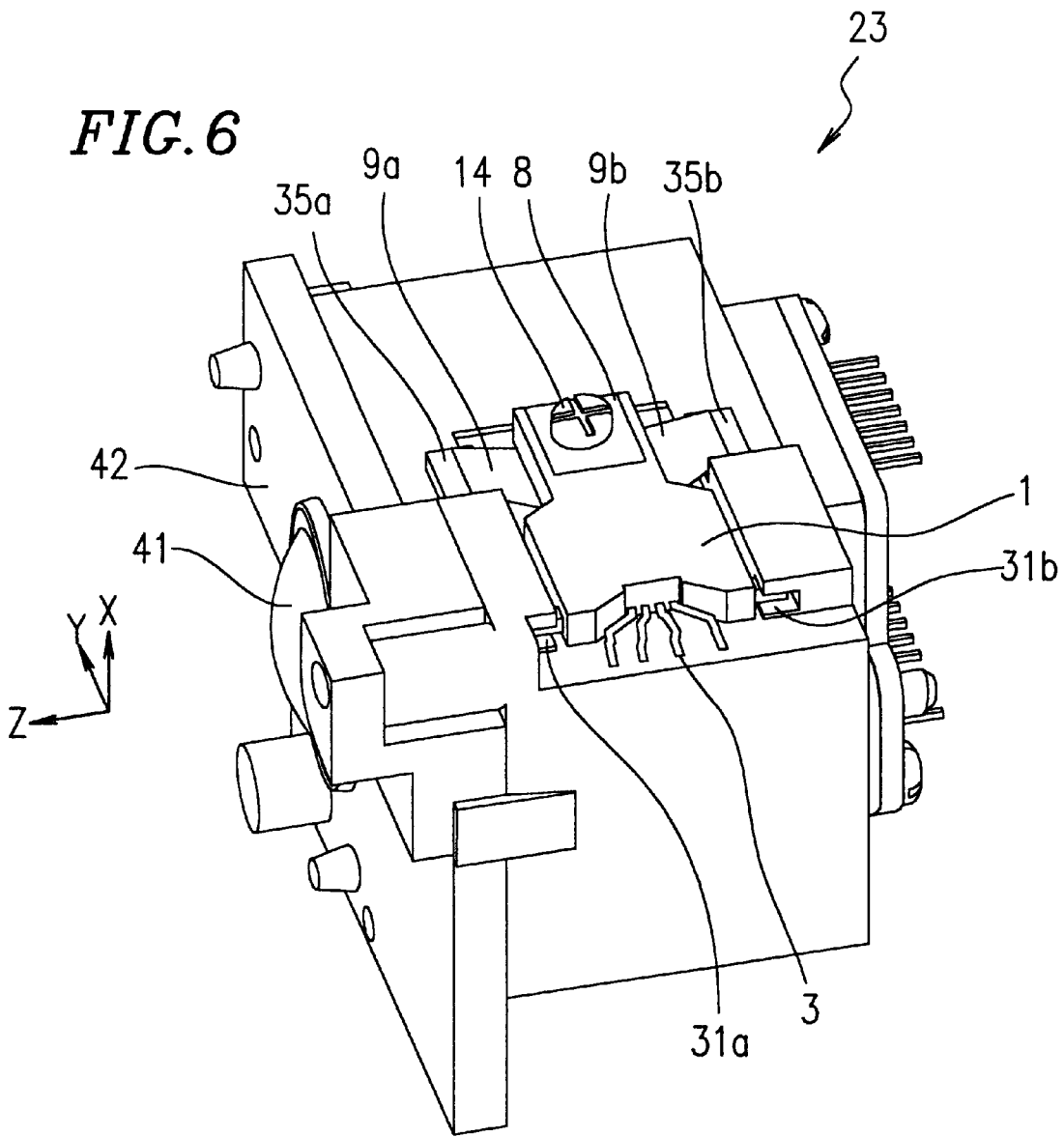
FIG. 6 in a perspective view showing the outward appearance of the lens barrel according to an example of the present invention.
Figure 7:
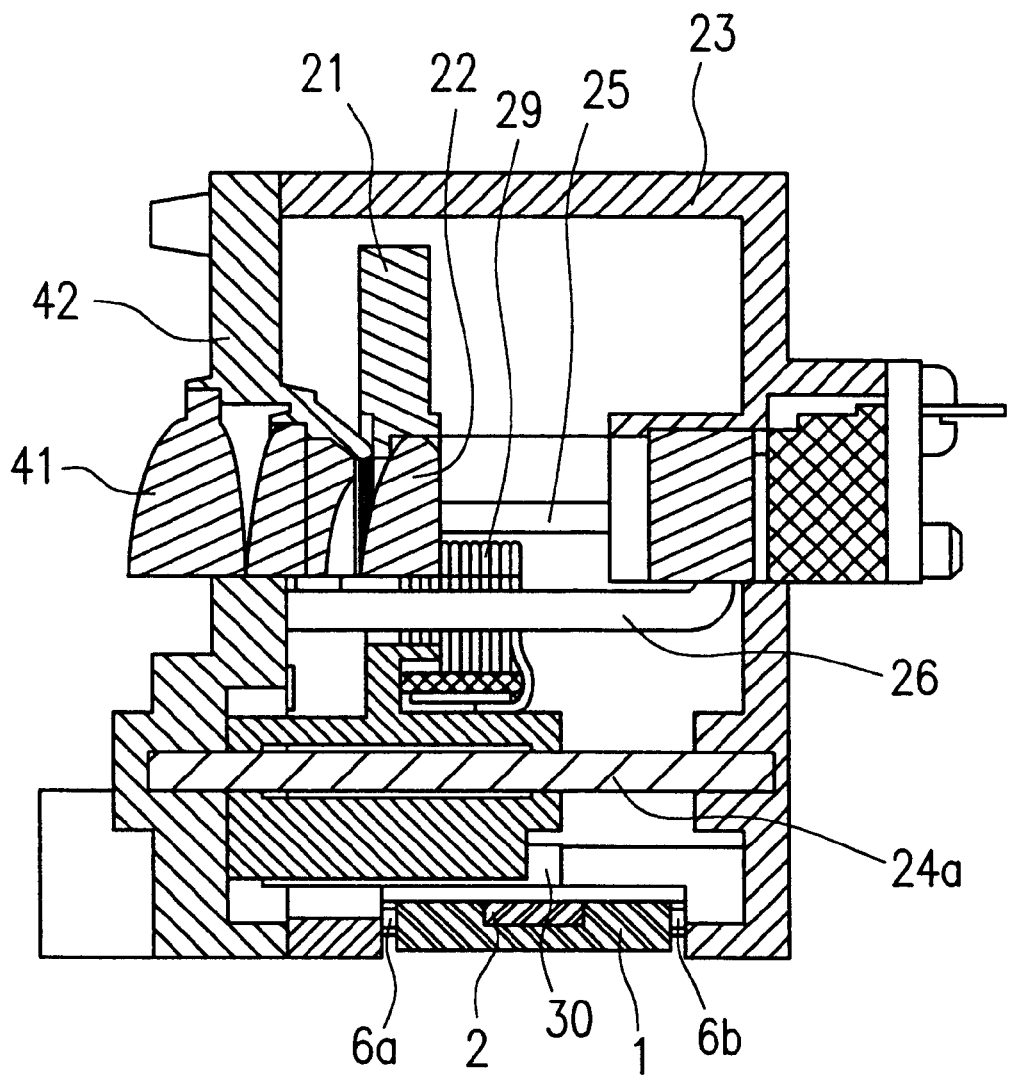
FIG. 7 is a cross-sectional view showing a lens barrel according to an example of the present invention as observed from above.
Figure 8:
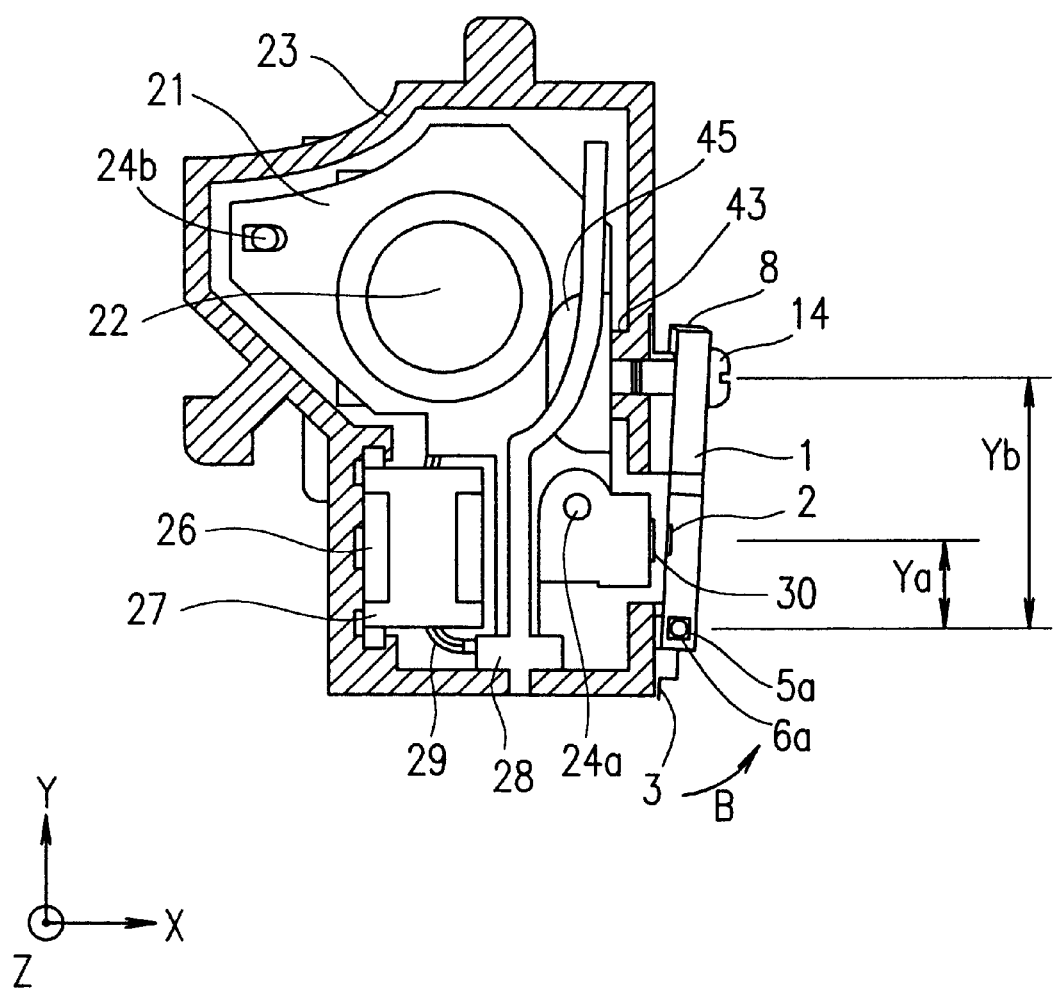
FIG. 8 is a partial cross-sectional view showing a lens barrel as observed from its front, for illustrating an adjustment method of a position detecting device according to an example of the present invention.
Figure 10:
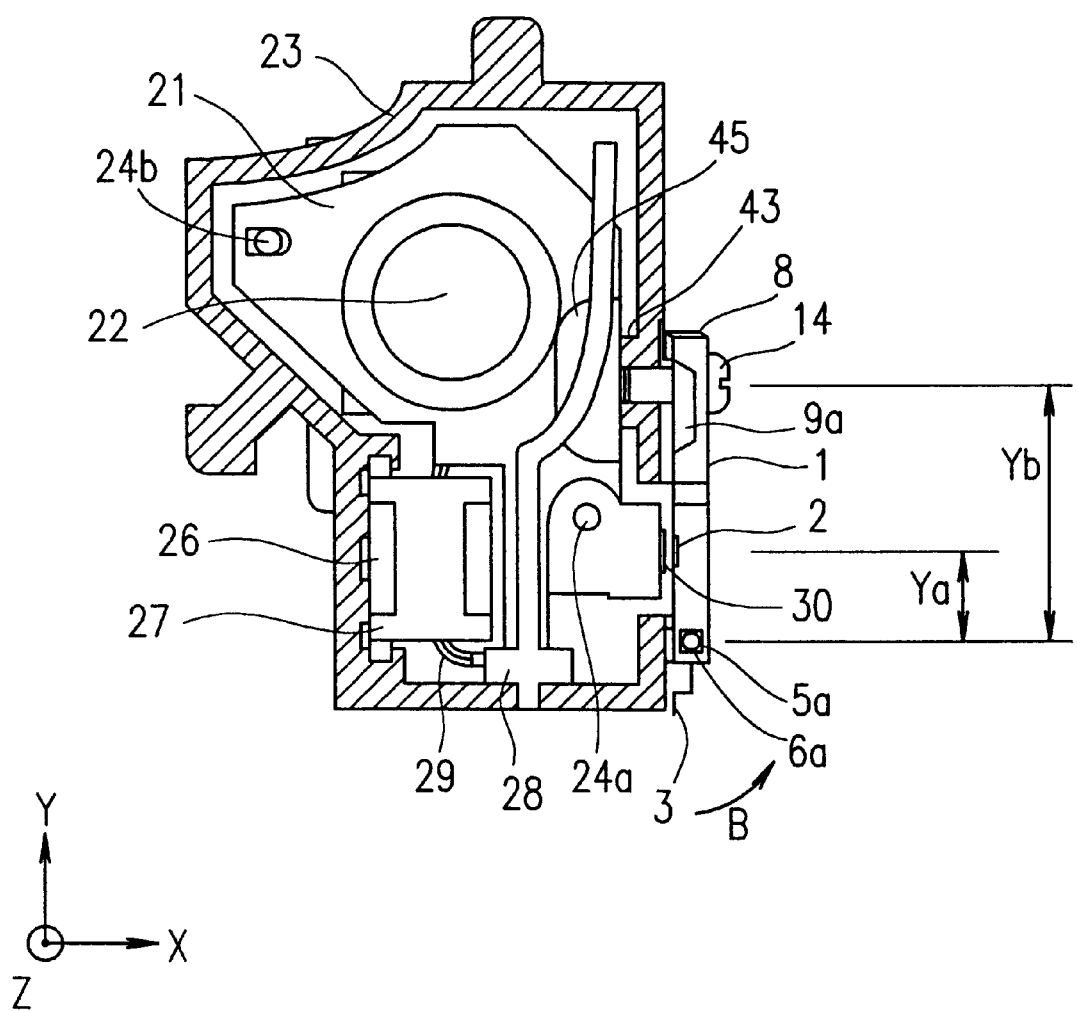
FIG. 10 is a partial cross-sectional view showing a lens barrel as observed from its front, for illustrating an adjustment method of a position detecting device according to an example of the present invention.
Figure 11:
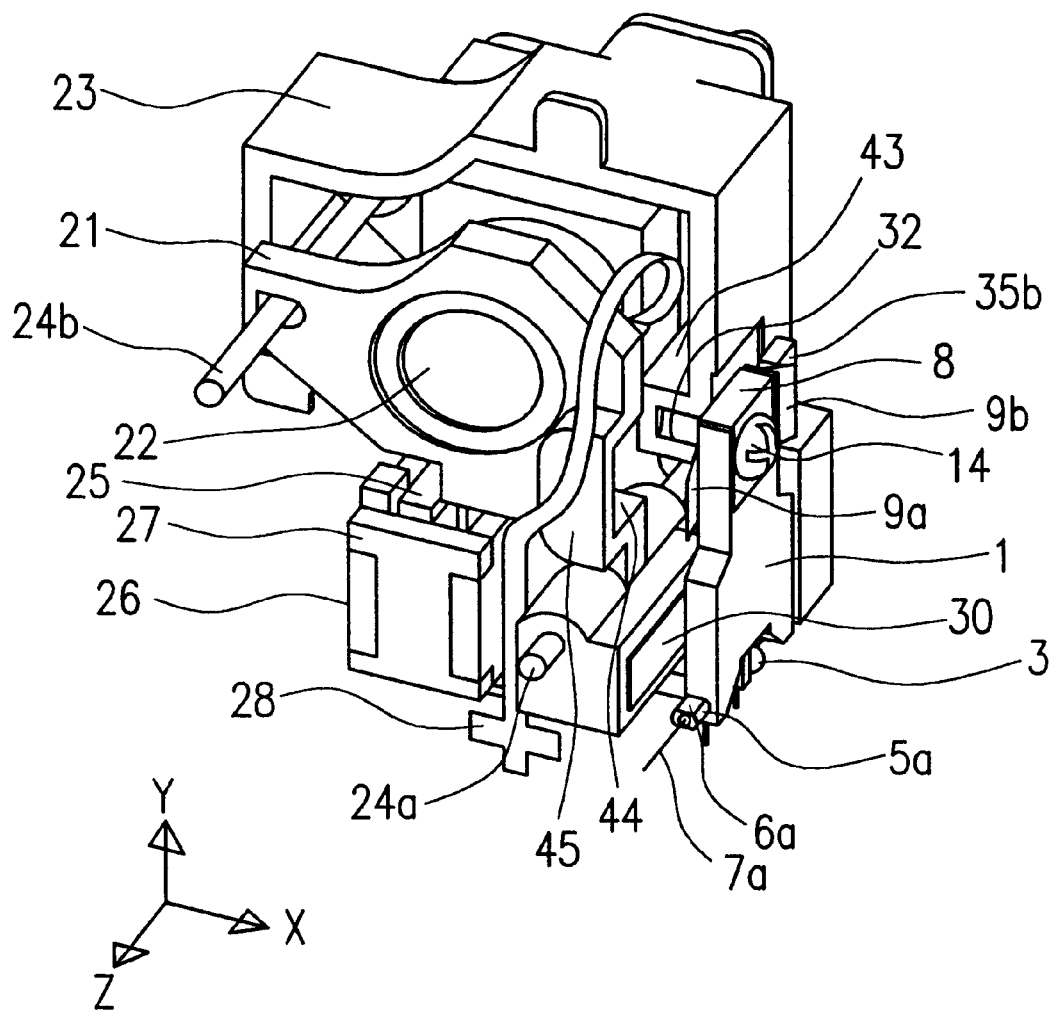
FIG. 11 is a perspective view of the lens barrel, including a partial cross-section, for illustrating the internal structure of the lens barrel.
Figure 12:
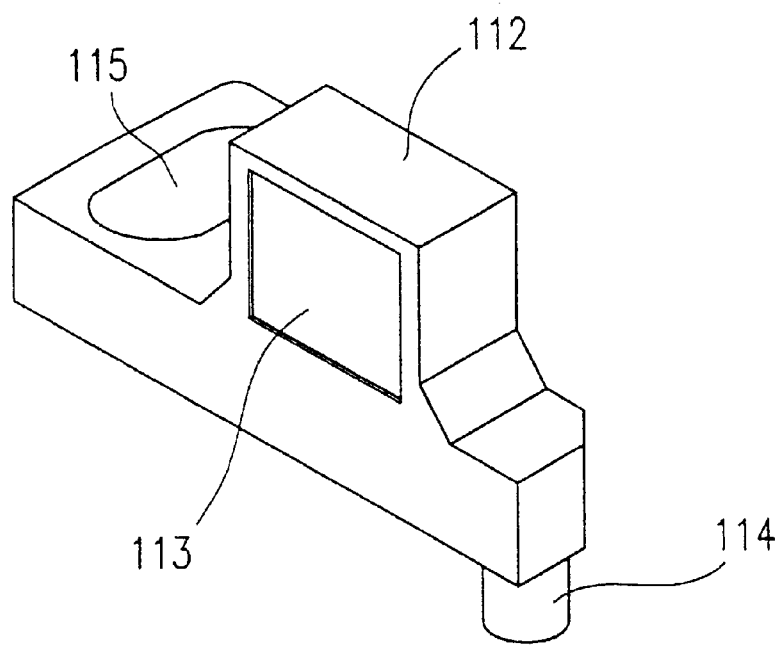
FIG. 12 is a perspective view showing a conventional position detecting device.
Figure 13:
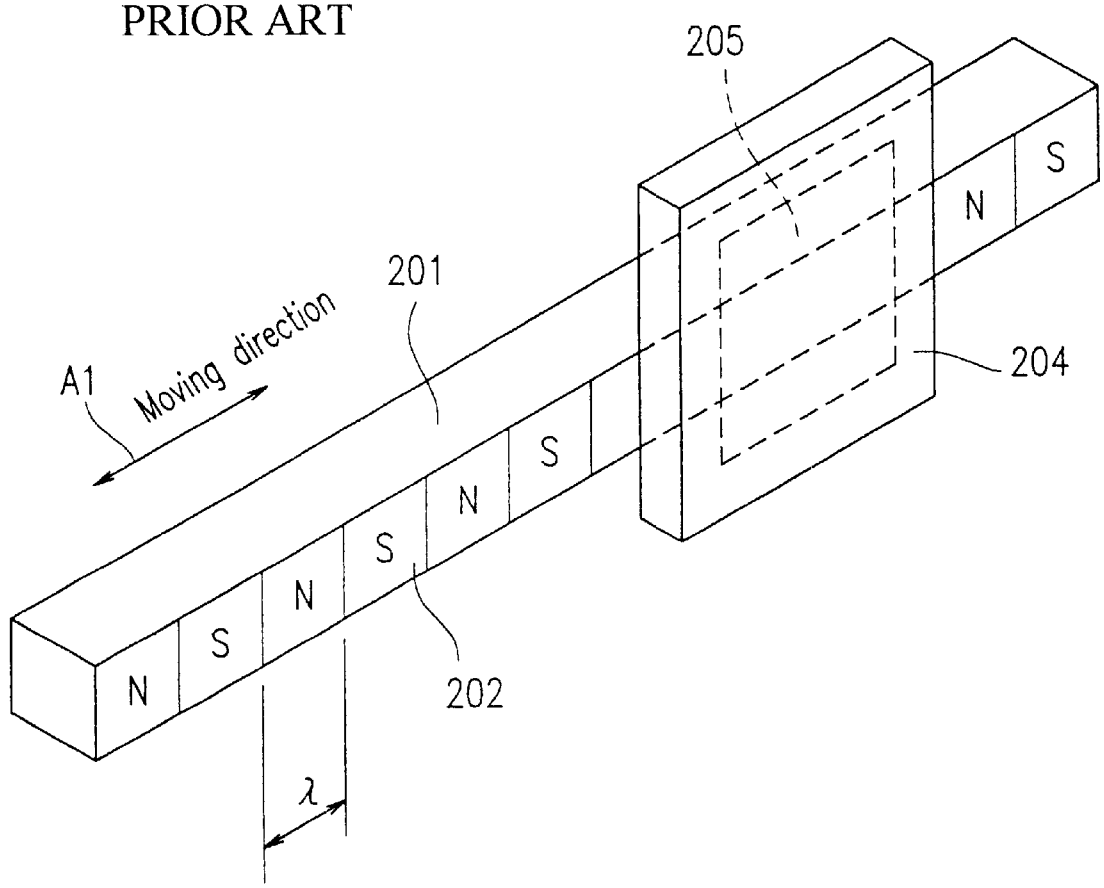
FIG. 13 in a perspective view showing a conventional position detecting device and a magnetic recording medium.
Figure 14:
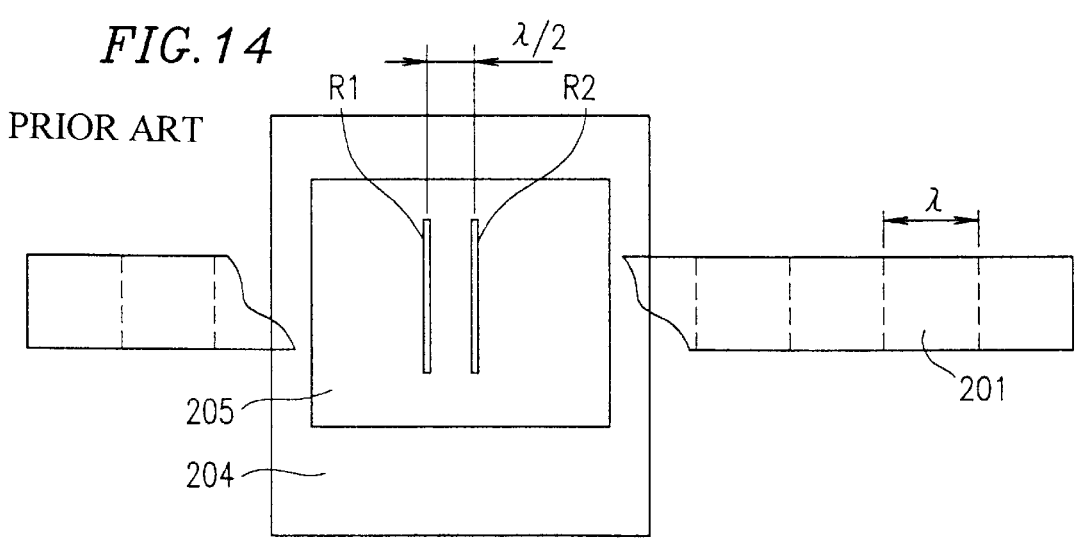
FIG. 14 is a front view showing a conventional position detecting device and a magnetic recording medium.
Figure 15A:
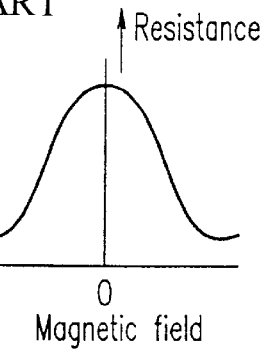
FIGS. 15A–15E are diagrams illustrating the operation principle of a magnetoresistive element.
Figure 15C:
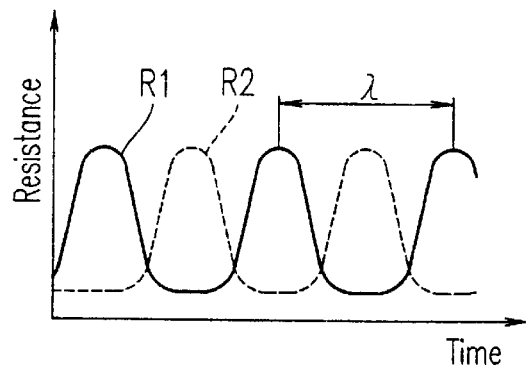
Figure 15B:
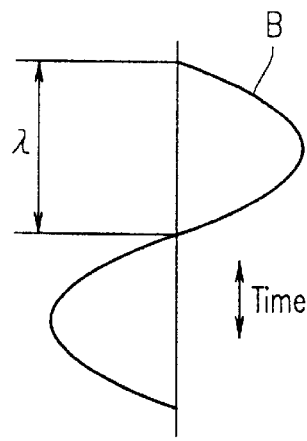
Figure 15D:
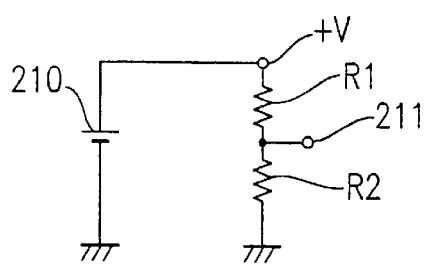
Figure 15E:
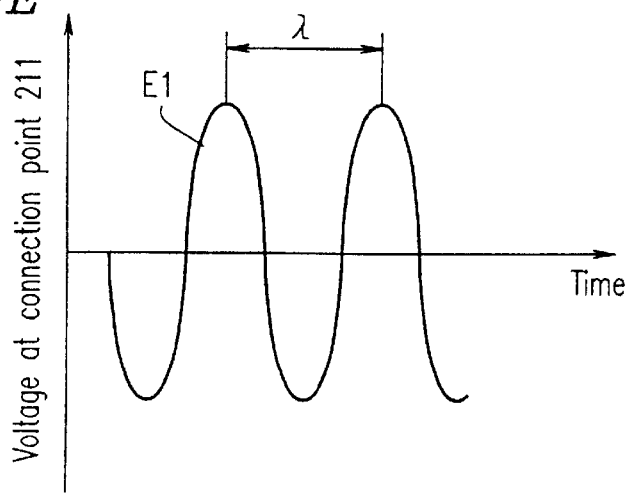
Figure 16:
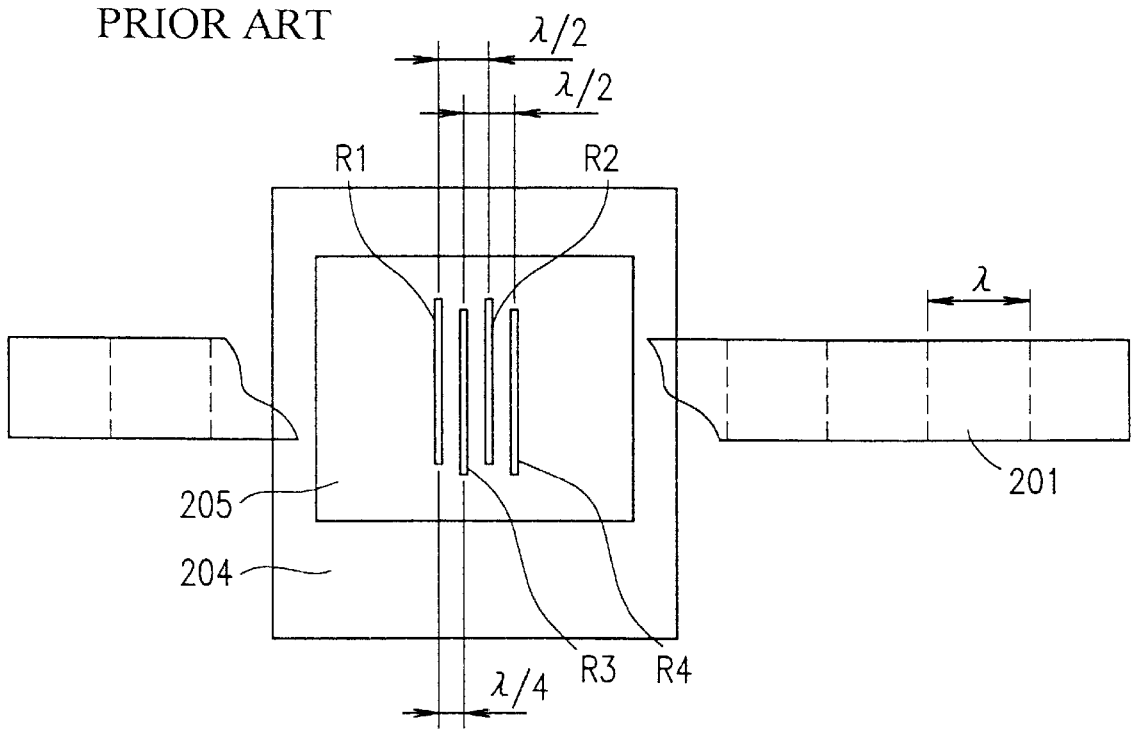
FIG. 16 is a diagram illustrating the determination method for moving direction of a magnetic recording medium according to a conventional position detecting device.
Figure 17:
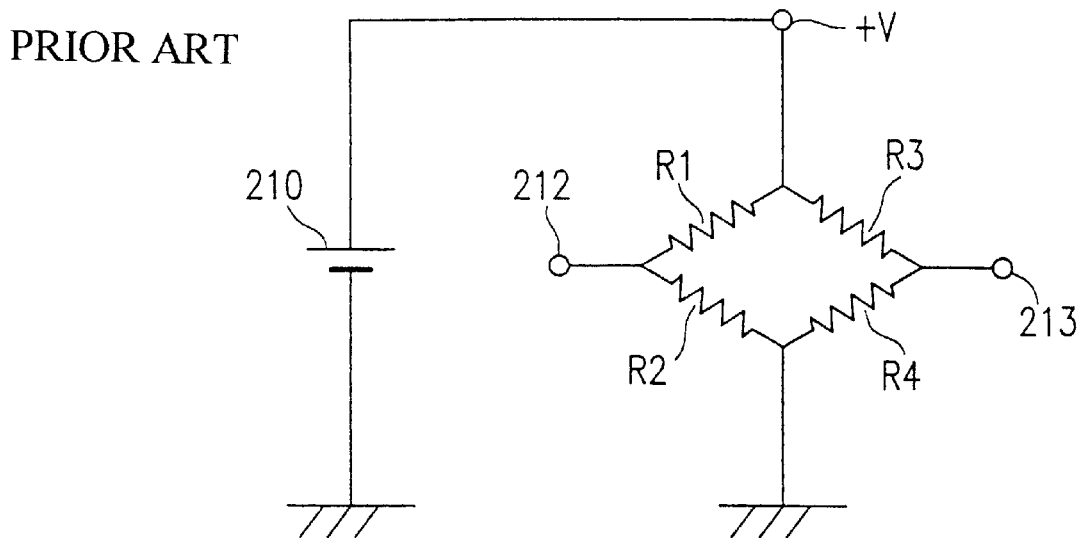
FIG. 17 is a diagram showing an equivalent circuit of magnetoresistive units according to a conventional position detecting device.
Figure 18:
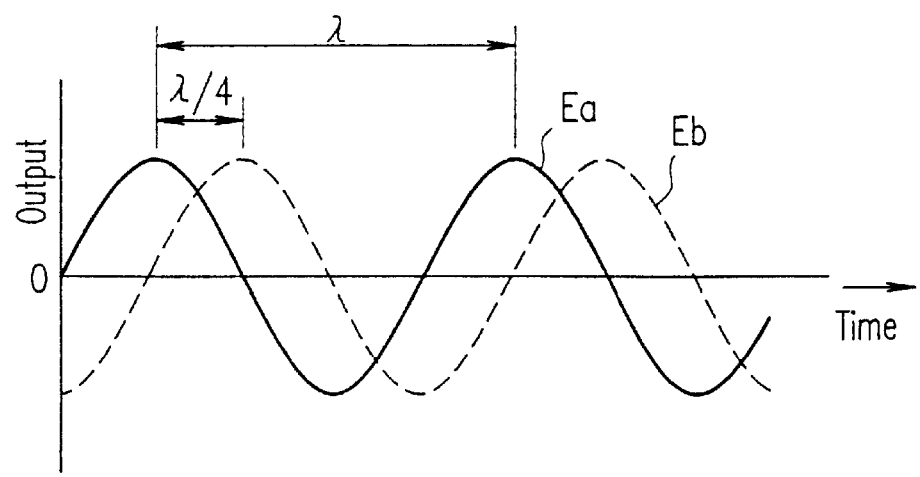
FIG. 18 is a diagram illustrating an output waveform from an equivalent circuit of magnetoresistive units according to a conventional position detecting device.
Figure 19:
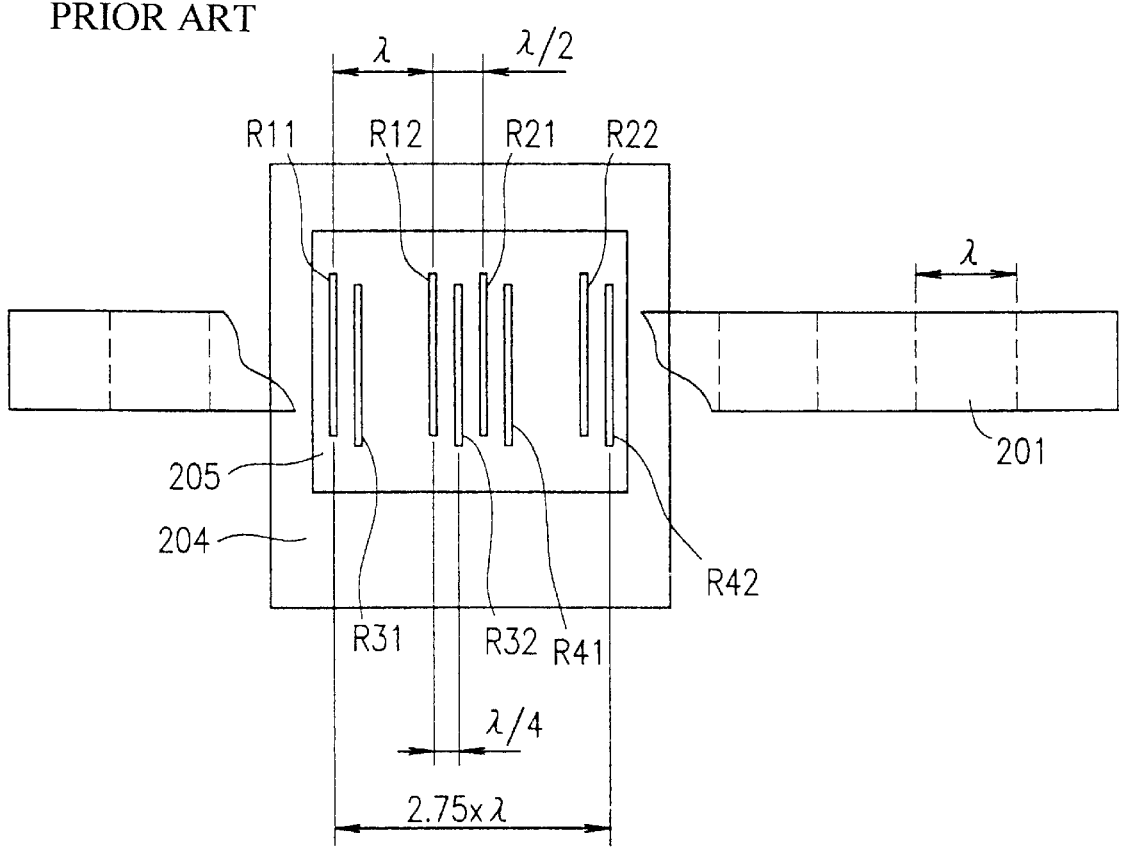
FIG. 19 is a front view of a conventional position detecting device including eight magnetoresistive units.
Figure 20:
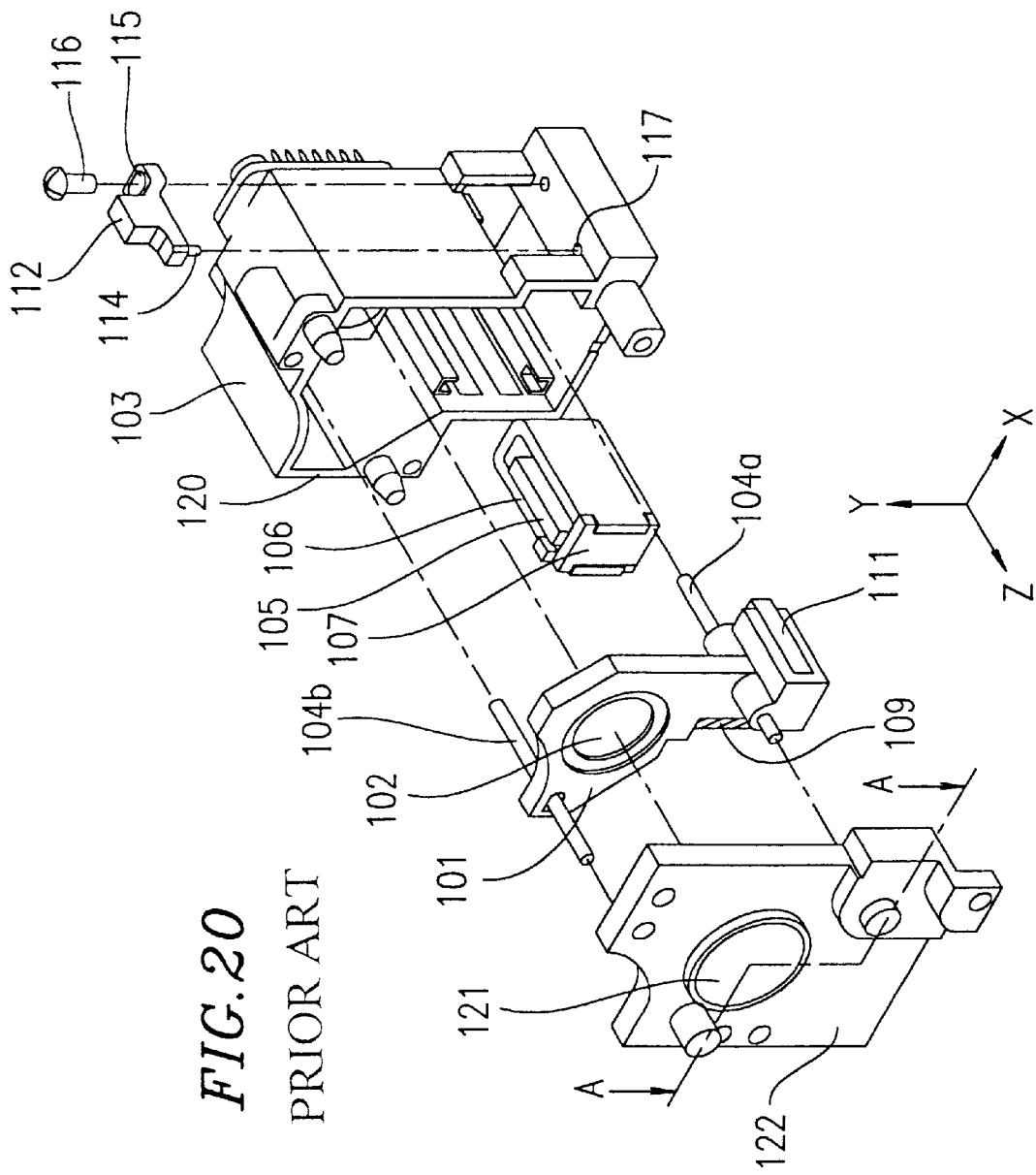
FIG. 20 is an exploded perspective view showing a conventional lens barrel.
Figure 21:
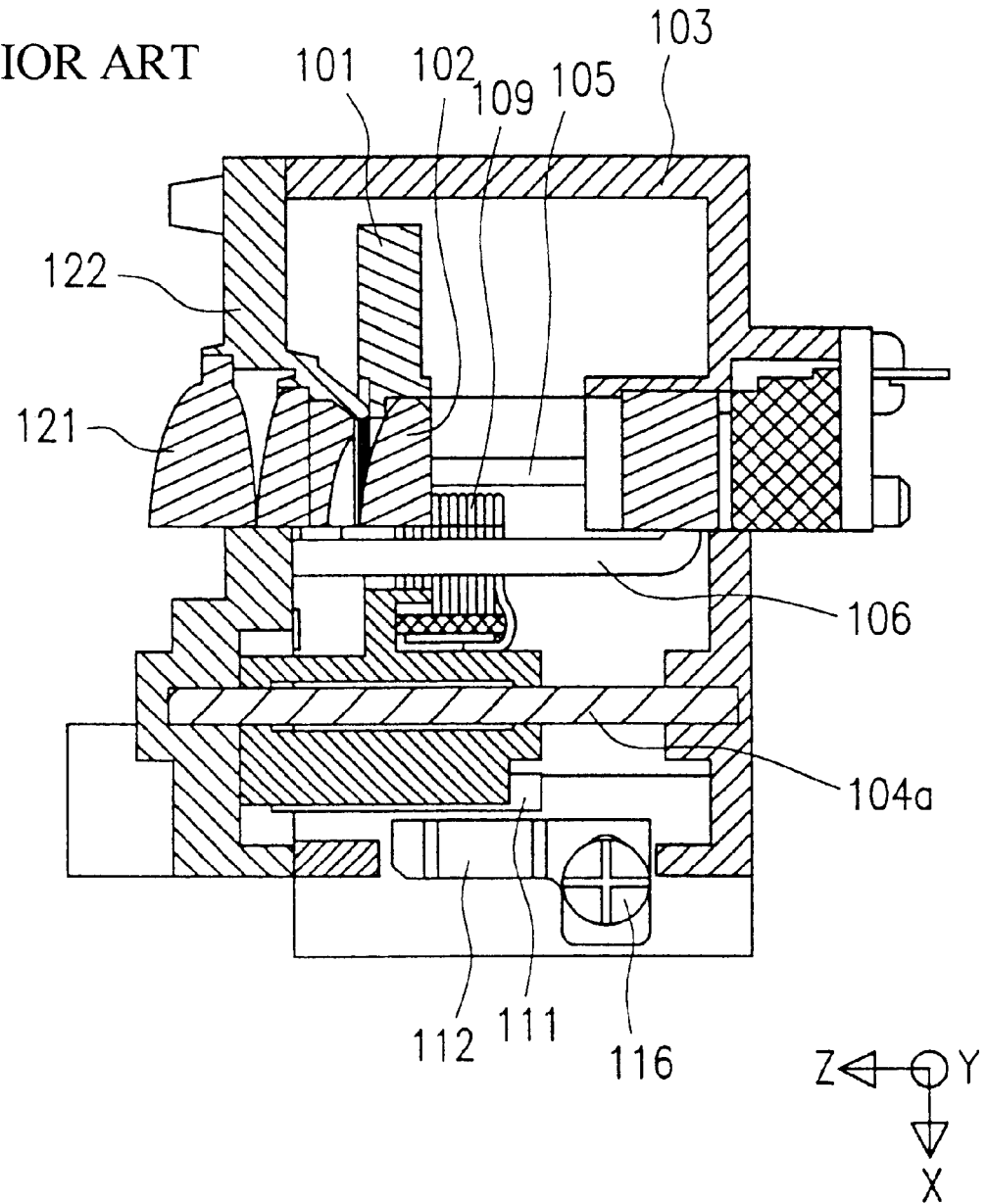
FIG. 21 is a cross-sectional view showing a conventional lens barrel as observed from above.
Figure 22:
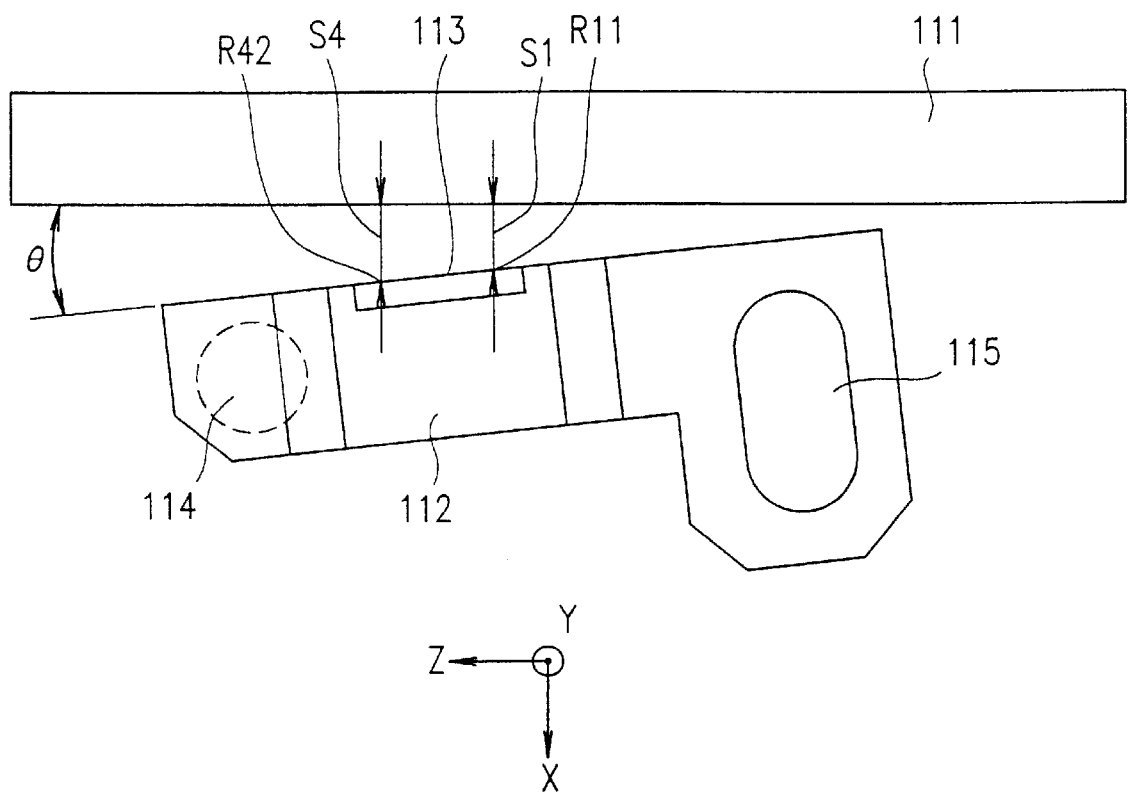
FIG. 22 is a diagram illustrating the relative positions of a conventional position detecting device and a magnetic scale.

FIGS. 1 and 2 are perspective views of a position detecting device; FIGS. 3 and 4 are exploded perspective views of a lens barrel incorporating the same; FIG. 5 is an exploded perspective view of a part of the lens barrel; FIG. 6 is a perspective view of the outward appearance of the lens barrel; FIG. 7 is a partial cross-sectional view of the lens barrel as observed from above FIGS. 8, 9, and 10 are partial cross-sectional views of the lens barrel as observed from its front, for illustrating an adjustment method of the position detecting device; FIG. 11 is a partial cross-sectional perspective view of the lens barrel.

First, the structure of a position detecting device 100 according to the present invention will be described with reference to FIGS. 1 and 2. A sensor face 2 (FIG. 2) formed of magnetoresistive elements, and lead frames 3 as input/output means for signals for the magnetoresistive element, are integrally affixed to a holder 1 by a insert molding, etc. The magnetoresistive element in the sensor face 2 forms a thin film pattern for enabling detection of the change of the magnetic flux moving along the Z-axis direction of FIG. 1, and is disposed so as to oppose the magnetic recording medium and used for position detection.

Pivoting pins 6a and 6b, which are projecting portions having curved faces 5a and 5b with a substantially constant curvature, are provided on both sides of holder 1. The pivoting pins 6a and 6b are integrally formed with the holder 1 through resin molding.

It will be appreciated that pivoting pins which are formed as a separate member such as metal may be attached by press-fitting, screwing, and the like. Here, the curved faces 5a and 5b are shaped so that center axes 7a and 7b of the curved faces 5a and 5b substantially become concentric. In addition, the direction of the center axes 7a and 7b are substantially parallel to the direction of the magnetic flux detected by the magnetoresistive elements in the sensor face 2, i.e., to the moving direction of the magnetic recording medium (Z-axis direction).

An attachment spring 8, which is an elastic member constituting the positioning means, is a structure having deformed portions 9a and 9b protruding on the right and left sides, and an attachment portion 10 which is bent in a U-shape and inserted in a groove 11 of the holder 1. The U-shape bend of the attachment portion 10 is formed so as to be slightly narrower than the thickness of the groove portion 11, so that it is possible to press hold the attachment spring 8 just by insertion, as shown in FIG. 2.

In this process, a through hole 12 of the attachment spring 8, and an attachment hole 13 provided on the holder 1, as positioning means are disposed so as to be substantially concentric, so that it in possible to insert the screw 14 an another positioning means. Moreover, it has a structure in which deformed portions 9a and 9b of the attachment spring 8 are deformed in a direction (X-axis direction) perpendicular to the sensor face 2 composed of magnetoresistive elements so that the holder 1 is biased in that direction. The holder 1 is affixed by screwing the screw 14 into a receptacle member.

As apparent from FIGS. 1 and 2, the attachment spring 8 and the screw 14 penetrating through the attachment hole 13 (positioning means) are located on the opposite side of the sensor face 2 (formed of magnetoresistive elements) from the pivoting pins 6a and 6b (projection portions). The lead frames 3 are placed between the pivoting pins 6a and 6b, and extend in a direction perpendicular to the axes 7a and 7b of the pivoting pins 6a and 6b (negative direction along the Y axis) within a plane (Z-Y plans) which lies in parallel to the sensor face 2. As a result, the holder 1 attains a flat, plate-like shape that is parallel to a plane which is perpendicular to the X axis direction so that downsizing of a position detecting device and a lens barrel incorporating the same can be further facilitated.

FIGS. 3 and 4 are exploded perspective views showing a lens barrel 200 which incorporates the position detecting device 100 having the aforementioned configuration. On an open face 40 which is located forward of a rear lens barrel 23 along the optical axis direction a fixed lens frame 42 is attached, which holds a compensation lens array 41 (which is a fixed lens array). A zooming lens array and a front lens barrel (not shown) are further disposed in this order along the optical axis direction (z-axis direction).

Inside the rear lens barrel 23, the lens frame 21 (as a lens holding means) holds a focusing lens 22 (as a moving lens array). The lens frame 21 is supported so as to be slidable in the optical axis direction (Z-axis direction) along guide shafts 24a and 24b, whose opposite ends are fixed on the rear lens barrel 23 and the fixed lens frame 42.

A linear motor as a driving means for driving the lens frame 21 along the optical axis direction includes the following stators: a driving magnet 25 which is magnetized perpendicular to the driving direction (Z-axis direction), a C-shaped main yoke 26, and a panel-like side yoke 27, provided on the rear lens barrel 23. As a moving portion, a coil 29 in affixed to the lens frame 21 so as to be a certain distance away from driving magnet 25. By applying an electric current to the coil 29 using a flexible print cable 28 in a direction perpendicular to the magnetic flux generated by the driving magnet 25, the lens frame 21 is driven along the optical axis direction (Z-axis direction).

On the other hand, an a magnetic recording medium for the position detecting device 100, a magnetic scale 30 which is formed of ferromagnetic material such as ferrite is provided on the lens frame 21, and its surface is alternately magnetized so as to have S poles and N poles at a pitch of about 200 μm along the driving axis direction of the lens frame 21 (Z-axis direction).

Next, a method for assembling the position detecting device onto the lens barrel will be described. As shown in FIG. 5, the rear lens barrel 23 as a receptacle member is provided with U-shape grooves 31a and 31b which are opened in the Y-axis direction, the U-shape grooves 31a and 31b being arranged in parallel to the optical axis direction (Z-axis direction).

First, the attachment spring 8 is inserted into the holder 1, as shown in FIG. 2. Next, as shown in FIG. 5, the projecting portion provided on the holder 1, i.e., the pivoting pins 6a and 6b, are inserted into the U-shape grooves 31a and 31b, along the Y-axis direction. The width of the U-shape grooves 31a and 31b are set so as to be slightly wider than the thickness of the pivoting pins 6a and 6b, so that the pivoting pins 6a and 6b can be inserted smoothly.

At this time, the holder 1 is inserted in the positive Y-axis direction while maintaining the posture as shown in FIG. 5. Such an assembling process is made possible because the rear lens barrel 23 is provided with the guides 34a and 34b which are slightly wider than the width of the holder 1.

When the pivoting pins 6a and 6b are inserted into the U-shape grooves 31a and 31b, the screw hole 32 provided on the rear lens barrel 23, and the attachment hole 13 provided on the holder 1 come in substantially concentric positions. Accordingly, the screw 14 is screwed into the screw hole 32 for affixing the holder 1 onto the rear lens barrel 23. FIG. 6 shows the configuration after the holder 1 is attached in the manner described above. As a result, the sensor face 2 of the holder 1 and the magnetic scale 30 provided on the lens frame 21 face each other through a detection window 33 provided in the rear lens barrel 23(FIG. 5).

FIG. 7 is a cross-sectional view taken along the line A—A of FIG. 3. With such a predetermined distance, the sensor face 2 and the magnetic scale 30 face each other in parallel postures along the optical axis direction (Z-axis direction).

Incidentally, jumper lines and a flexible print cable (not shown) are soldered on the lead frames 3 of the holder 1 for connection with external circuits. In this case, since the lead frames 3 extend from the vicinity of the mid point between the pivoting pins 6a and 6b in the negative Y-direction, the lead frames 3 are not configured so as to stick out from the lens barrel 200, thereby enabling further downsizing of the lens barrel 200. Moreover, even after the jumper lines and the flexible print cable (not shown) are soldered onto the lead frames 3, it is still possible to insert the holder 1 into the rear lens barrel 23 while maintaining the posture as shown in FIG. 5.

Next, the fixing method of holder 1 will be described in more detail. As the pivoting pins 6a and 6b of the holder 1 are inserted in the U-shape grooves 31a and 31b, the screw 14 beginning to be screwed, the holder 1 takes a posture as shown in FIG. 8. That is, the deformed portions 9a and 9b of the attachment spring 8 start making contact with the spring receptors 35a and 35b, which are formed on the rear lens barrel 23 (FIG. 6). At this time, the spacing between the sensor face 2 of the holder 1 and the magnetic scale 30 provided on the lens frame 21 is about 500 μm, which is sufficiently larger than the reference gap amount (FIG. 8).

From this state, the screw 14 is further screwed in, then the deformed portions 9a and 9b are elastically deformed along a direction perpendicular to the sensor face 2 (X-axis direction), so as to bias the holder 1 in that direction (positive X-axis direction). Since the screw 14 is screwed in against this biasing force, the holder 1 can be firmly affixed onto the rear lens barrel 23.

Figure 9A:
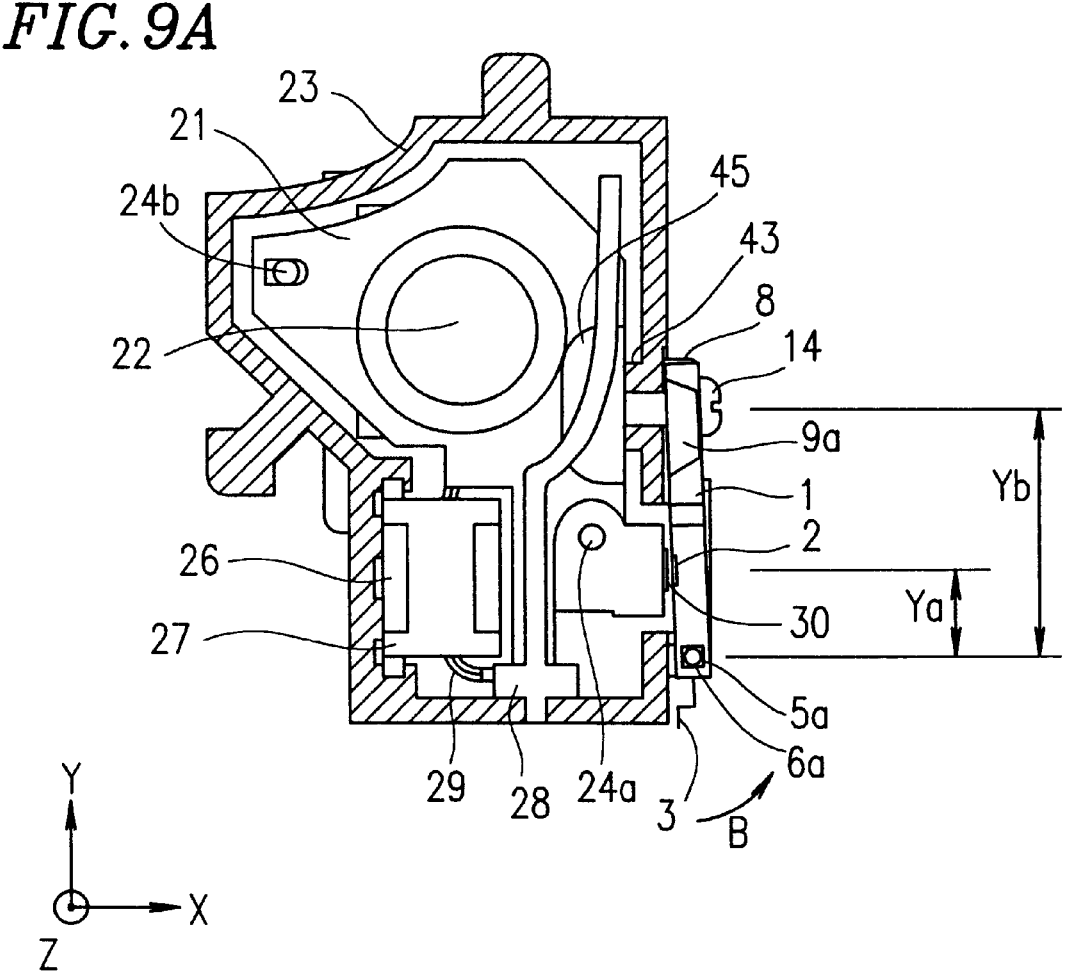
FIGS. 9A and 9B are partial cross-sectional views showing a lens barrel as observed from its front, for illustrating an adjustment method of a position detecting device according to an example of the present invention.
Figure 9B:
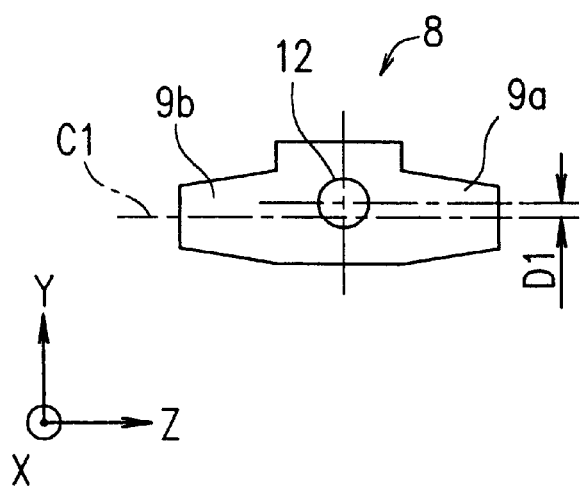

In this case, as shown in FIGS. 9A and 9B, the deformed portions 9a and 9b are configured so as to be slightly shifted downward along the Y-axis direction with regard to the attachment hole 13, through which the screw 14 penetrates. That is, the center axis C1 (with regard to the Y-axis direction) of the deformed portions 9a and 9b is shifted downward along the Y-axis direction by a distance D1 with respect to the attachment hole 13 (and the through hole 12), through which the screw 14 penetrates, so that a moment (i.e., a moment for revolution around the Z-axis), which is represented by arrow B in FIG. 9A, is simultaneously created. Due to this moment, the curved faces 5a and 5b of the pivoting pins 6a and 6b are pressed onto the side faces of the U-shape grooves 31a and 31b.

Therefore, the holder 1 pivots in the counterclockwise direction so that the gap between the sensor face 2 and the magnetic scale 30 becomes narrower. The distance D1 is, for example, about 0.5 mm.

As described above, the width of the grooves 31a and 31b are set so as to be slightly wider than the thickness of the pivoting pins 6a and 6b. The pivoting pins 6a and 6b, however, do not translate along the X-axis direction but pivot around the center axes 7a and 7b of curved faces 5a and 5b, because the curved faces 5a and 5b are pressed against the side faces of the U-shape grooves 31a and 31b by the moment represented by arrow B. Therefore, the amount of decrease of the spacing between the sensor face 2 and the magnetic scale 30 is substantially in proportion to the pivoting angle of the screw 14.

Now, FIG. 9A shows a state in which the screw 14 is completely screwed in. In this state, the spacing between the sensor face 2 and the magnetic scale 30 is about 30 μm, which is narrower than the reference gap amount. Because the deformed portions 9a and 9b of the attachment spring 8 are elastically deformed, if the screw 14 is loosened, the holder 1 will pivot in the clockwise direction so that it is possible that the spacing between the sensor face 2 and the magnetic scale 30 can be widened. In this case, too, because the holder 1 pivots around the center axes 7a and 7b, the amount of increase of the spacing is substantially in proportion to the pivoting angle of the screw 14. Therefore, the spacing between the sensor face 2 and the magnetic scale 30 can be set at the reference gap amount, i.e., 100 μm, by adjusting the degree to which the screw 14 is screwed.

FIG. 10 shows a state in which the adjustment is completed, where the holder 1 is substantially set in a vertical position. As described above, a magnetoresistive element has such characteristics that its output rapidly decrease as the spacing becomes wider than the reference gap amount, and that its output is distorted as the spacing becomes narrower than the reference gap amount. By utilizing such characteristics, the spacing between the sensor face 2 and the magnetic scale 30 will be adjusted in a manner described below.

First, a current in applied through the flexible print cable 28 to the coil 29 so as to cause the lens frame 21 to reciprocally move along the optical axis direction in a continuous manner. During this, an A-phase output and a B-phase output of the magnetoresistive elements are measured through the lead frames 3 using an oscilloscope and the like, and then the sinusoidal reproduction output waveforms and their peak voltages are monitored.

As shown in FIG. 8, when the spacing between the sensor face 2 and the magnetic scale 30 is wide, the peak voltage is small. As the screw 14 is further screwed in from this state, the holder 1 pivots in the counterclockwise direction, so as to narrow the spacing between the sensor face 2 and the magnetic scale 30 so that the peak voltage of the reproduction outputs rapidly increases.

As the screw 14 is further screwed in, the spacing becomes narrower than the reference gap amount, and the peak voltage no longer increases. Then, the output wave forms are distorted and change from sine curves into triangular waves.

Therefore, by first screwing the screw 14 down to a position in which the completion of the peak voltage increase is confirmed and then loosening back the screw 14, the spacing between the sensor face 2 and the magnetic scale 30 can be set to the reference gap amount. As for the amount by which the screw 14 should be loosened, excellent results, in which the variation between each adjustment is little, were achieved when it was adjusted to a point where the peak voltage was about 5% lower than the maximum value of the peak voltage.

The configuration which is essential for smoothly performing such an adjusting process will be further described, with reference to FIGS. 8 through 10. As apparent from the above description, the spacing between the sensor face 2 and the magnetic scale 30 changes in proportion to the pivoting angle of the screw 14. The factor of proportionality is determined by a screw pitch P and the ratio between dimensions Ya and Yb shown in FIG. 8. Here, Ya is the distance from the center axes 7a and 7b to the center of the sensor face 2, and Yb is the distance from the center axes 7a and 7b to the attachment hole 13.

Specifically, when the screw 14 rotates once, the attachment hole 13 portion of the holder 1 moves in the X-axis direction by the screw pitch P. In this case, the holder 1 pivots around the center axes 7a and 7b, so that the spacing between the sensor face 2 and the magnetic scale 30 changes by an amount of P×Ya/Yb.

Therefore, if the dimensional ratio Ya/Yb between Ya and Yb is set at a large value, the spacing will significantly change with a slight rotation of the screw 14 thereby making the adjusting process difficult. On the other hand, if the dimensional ratio of Ya/Yb is set at a small value, it will be necessary to rotate the screw 14 many times from the state shown in FIG. 8 before reaching the reference gap amount so that the adjusting process can take longer. This will also increase the moving amount of screw 14, which is one factor which hinders the downsizing of the apparatus.

Therefore, it is necessary to set the dimensional ratio of Ya/Yb at an optimal value. For example, in the case of using a screw 14 such that P=350 μm, the adjusting process was performed easily and quickly by setting Ya/Yb=0.2 to 0.4.

In accordance with the holder 1 shown in FIGS. 1 and 2, the screw 14, which penetrates through the attachment spring 8 and the attachment hole 13 (positioning means) are placed at the opposite side of the sensor face 2 (formed of magnetoresistive elements) from the pivoting pins 6a and 6b (projection portions). Therefore, the relation Ya<Yb always holds so that the dimensional ratio Ya/Yb can be set to the optimal value as described above.

Now, the biasing force generated by the attachment spring 8 is also applied at the contact portion of the screw 14 and the screw hole 32 as a counter force. If the connecting between the screw 14 and the screw hole 32 is not sufficient relative to the biasing force generated by the attachment spring 8, there is a possibility for the screw 14 to come off. Therefore, it is necessary to increase the depth of the screw hole 32. The standard thickness of the rear lens barrel 23 is on the order of 1 mm to 2 mm, which is not strong enough to firmly affix a screw 14 having a size of M1.6.

Therefore, in order to deepen the screw hole 32, it is necessary to form screw boss 43 as shown in FIG. 11 so as to introduce portions with an increased thickness. However, there is a problem in that the screw boss 43 may interfere with the lens frame 21 moving along the optical axis direction (Z-axis direction).

One designing method for allowing for the stroke of the lens frame 21 is to relocate the screw 14, screw hole 32 and screw boss 43 to positions which are shifted in the positive Y-axis direction so as to avoid the interference between the lens frame 21 and the screw boss 43.

In this designing method, however, the value of Yb becomes so large that it is not possible to set dimensional ratio Ya/Yb at the optimal value as mentioned above. In addition, the overall height of the holder 1 also becomes taller so that there is a problem in that the manufacturing cost of the position detecting device increases.

As another designing method, the lens frame 21 may be notched so as to avoid the interference with the screw boss 43. In this designing method, however, the strength of the notched portions decreases so that there is a disadvantage in that the resonant frequency of the lens frame 21 may decrease.

The lens frame 21, which holds the focus lens 22 as in this example, is required to move extremely quickly. If the resonant frequency of the lens frame 21 decreases, it leads to serious problems, e.g., the desired performance may not be achieved, or the quality of the apparatus may be degraded due to extreme increases in vibration and noise. In the case that the position of the screw boss 43 is near the focus lens 22, as shown in this example, the strength around the focus lens 22 is especially decreased. Since the focus lens 22 has a large mass, there is problem in that the resonant frequency of the lens frame 21 becomes extremely low, making it impossible to achieve the desired performance.

Therefore, according to the present example, an escape hole 44 is provided on the lens frame 21, the escape hole 44 being covered by a reinforcement projection 45, as shown in FIG. 11. The reinforcement projection 45 protrudes in a forward direction (positive Z-axis direction) along the optical axis. As a result, owing to synergetic effects with the escape hole 44, the lens frame 21 and the screw boss 43 do not interfere with each other. In addition, the reinforcement projection 45 covers the escape hole 44 on three sides so that the resonant frequency of the lens frame 21 does not decrease. Therefore, it is possible to provide a high quality lens barrel with less vibration and less noise.

As described above, in accordance with the position detecting device 100 of the present example and the lens barrel 200 incorporating the same, the pivoting pins 6a and 6b having the curved faces 5a and 5b with substantially a constant curvature are provided on both sides of the holder 1, and in addition, the curved faces 5a and 5b are shaped so that the center axes 7a and 7b of the curved surfaces 5a and 5b are disposed in a substantially concentric manner.

Moreover, when affixing the holder 1 to the receptacle portion (i.e., the rear lens barrel 23) by means of the screw 14, the holder 1 pivots around the center axes 7a and 7b of curved surfaces 5a and 5b, so that the spacing between the sensor face 2 and the magnetic scale 30 can be simultaneously adjusted.

Therefore, it is possible to simultaneously perform the process of adjusting the spacing and the process of affixing the holder 1, and it is possible to simultaneously complete the adjusting process and the assembling process so that there is provided an advantage of reducing the manufacturing cost of the apparatus.

Also, when affixing the holder 1 onto the rear lens barrel 23, the deformed portions 9a and 9b of the attachment spring 8 come in contact with the spring receptors 35a and 35b, and are deformed in a direction perpendicular to the sensor face 2 thereby biasing the holder 1 in that direction. By just screwing in the screw 14 agaist this biasing force, the holder 1 can be affixed firmly onto the lens barrel 23 so that the reliability of the apparatus is improved. In addition, the holder 1 pivots around the center axes 7a and 7b of the curved faces 5a and 5b, so as to permit adjustment of the spacing between the sensor face 2 and the magnetic scale 30. Therefore, it is possible to easily perform the adjusting process and the assembling process, providing an advantage of improving the processing efficiency and reducing the manufacturing cost.

Moreover, the deformed portions 9a and 9b are attached so as to be shifted slightly downward with respect to the attachment hole 13, through which the screw 14 is inserted. This design generates a biasing force as well as a moment. The curved faces 5a and 5b of the pivoting pins 6a and 6b are pressed against the sides of the U-shape grooves 31a and 31b. Therefore, it is possible to avoid the sliding of the pivoting pins 6a and 6b.

As a result, the increase and decrease amount of the spacing between the sensor face 2 and the magnetic scale 30 can be set substantially in proportion to the rotation angle of the screw 14. Therefore, there is a superior advantage in that an adjusting process that matches the senses of an operator is made possible, and that the adjusting process can be completed in a shorter period.

Furthermore, the center axes 7a and 7b extend along the direction of the magnetic flux detected by the magnetoresistive elements in the sensor face 2, i.e., a direction substantially parallel to the moving direction of the magnetic recording medium. Therefore, it is possible to maintain a substantially parallel posture to the moving direction of the magnetic recording medium even if the holder 1 is pivoted around the axes 7a and 7b during an adjusting process.

Therefore, unlike conventional examples, the spacing between the sensor face 2 and the magnetic scale 30 does not change along the moving direction of the magnetic recording medium. Thus, the waveform accuracy of A-phase output Ea and B-phase output Eb is not degraded. By processing these outputs, it is possible to achieve a position detecting accuracy on the order of 1 $\mu$m, which is much smaller than the magnetization frequency $\lambda$=200 $\mu$m of the magnetic scale 30.

Moreover, the screw 14, which is inserted in the attachment spring 8 and the attachment hole 13 (positioning means) is placed on the opposite side of the sensor face 2 (formed of magnetoresistive elements from the pivoting pins 6a and 6b (projecting portions). As a result, it is possible to adjust to the optimal value the dimensional ratio Ya/Yb between a distance Ya from the center axes 7a and 7b to the center of sensor face 2, and a distance Yb from the center axes 7a and 7b to the center of the through hole 12. Therefore, there is provided an advantage of enabling an easy and quick adjusting process.

In addition, it is possible to form the holder 1 in a flat plate-like shape which lies within a plans extending in parallel to the sensor face 2 so that there is provided an advantage of enabling downsizing of the position detecting device and the lens barrel incorporating the same.

Furthermore, the lead frames 3 are configured so as to be taken out from the vicinity of the central axes 7a and 7b of the pivoting pins 6a and 6b along a direction perpendicular to the center axes 7a and 7b, while remaining within the plane parallel to the holder 1. As a result, the lead frames 3 are not configured so as to stick out from the lens barrel. Therefore, in terms of connection with external circuits, it is still possible to provide a smaller lens barrel so that further downsizing of the apparatus is possible.

The C-shape bend of the attachment portion 10 of the attachment spring 8 is configured so as to be slightly thinner than the thickness of the portion of the groove 11 of the holder 1. This makes it possible to press hold the attachment spring 8 by merely inserting the spring 8. Therefore, there is provided an advantage in that the attachment spring 8 does not come off during an affixation process of the holder 1, so that the assembling process becomes easier.

In addition, on the rear lens barrel 23, U-shape grooves 31a and 31b, whose width is slightly wider than the thickness of the pivoting pins 6a and 6b, are provided along a direction parallel to the optical axis direction. Therefore, the pivoting pins 6a and 6b are easily inserted into the U-shape grooves 31a and 31b.

Furthermore, guides 34a and 34b, which are slightly wider than the width of the holder 1, are provided. As a result, during insertion of the pivoting pins 6a and 6b into the U-shape grooves 31a and 31b, the holder 1 and the attachment spring 8 do not become obstacles if both sides of the holder 1 are guided by the guides 34a and 34b so that the processing efficiency is improved.

In addition, even after jumper lines and flexible print cables are soldered onto the lead frames 3, it is possible to insert the holder 1 into the same direction so that there is an advantage of improving the efficiency of assembling.

Also, an escape hole 44 is provided on the lens frame 21, the escape hole 44 being covered by a reinforcement projection 45, so that the lens frame 21 and the screw boss 43 do not interfere with each other.

Moreover, since the reinforcement projection 45 is shaped so as to cover the escape hole 44 the resonant frequency of the lens frame 21 is not degraded. Therefore, there is an advantage of enabling the provision of a high quality lens barrel with less vibration and less noise.

Furthermore, the position detecting device according to the present invention can be incorporated not only in a lens barrel described above but also in a position detecting device for use in a recording/reproduction device, e.g., a hard disk and a magnet-optical disk, a printing apparatus, e.g., a plotter and a printer, or industrial apparatuses, e.g., a robot, whereby similar effects can be obtained.

In the above example illustrates a case in which the projections (pivoting pins 6a and 6b) are provided on the holder 1 and the U-shape grooves 31a and 31b are provided on the rear lens barrel 23. However, the present invention is not limited thereto. The holder 1 may be provided with a hole or a groove, and the rear lens barrel 23 may be provided with projections.

INDUSTRIAL APPLICABILITY

As described above, according to a position detecting device of the present invention, projections which have substantially a constant curvature are provided on a holder for holding magnetoresistive elements, which oppose a magnetic recording medium. When the holder is attached by a positioning means, the holder pivots around the axis of the curved face of the projection, and thus the spacing between the magnetoresistive elements and the magnetic recording medium is adjusted, so that it is possible to simultaneously complete the adjusting process and the assembling process. Therefore, there is provided an advantage of reducing the manufacturing cost of the apparatus.

According to another position detecting device of the present invention, positioning means are constructed from an elastic member, which biases the holder in a direction substantially perpendicular to the sensor face of the magnetoresistive elements, an attachment hole formed on the holder, and a screw inserted into the attachment hole. By screwing the screw into the receptacle member against the biasing force of the elastic member, the holder is positioned while simultaneously adjusting the spacing between the magnetic recording medium and the magnetoresistive elements. Thus, there is provided an advantage of making it possible to fix the holder firmly on the receptacle member, and to easily perform the adjusting process and the assembling process so that it reduces the manufacturing cost by improving the processing efficiency.

According to a still another position detecting device of the present invention, the curved surface of the projection is formed so as to have an axis substantially parallel to the moving direction of the magnetic recording medium, so that the spacing between the magnetoresistive elements and the magnetic recording medium does not vary along the moving direction of the magnetic recording medium. Therefore, the waveform accuracy of A-phase output Ea and B-phase output Eb do not deteriorate, so that it is possible to achieve an extremely high accuracy in position detection by processing these outputs.

According to a still another position detecting device of the present invention, the positioning means are placed at the opposite side of the magnetoresistive elements from the projection, so that it is possible to optimize the rate of increase/decrease amount of the spacing between the sensor face and the magnetic recording medium relative to the rotating angle of the screw. Therefore, there is provided an advantage of enabling an easy and quick adjusting process. In addition, the holder can be shaped into a flat panel-like configuration which is parallel to the sensor face. Therefore, there is provided an advantage of enabling downsizing of a position detecting device and a lens barrel incorporating the same.

According to a lens barrel of the present invention, the lens barrel includes a lens holding means which is slidable in the optical axis direction along the guide axis supported inside the barrel, and a driving means for driving the holding means along the optical axis direction, where the position detecting device according to the present invention is used as the position detecting means for detecting the position of the lens holding 1 means along the optical axis direction. Therefore, it is possible to provide a smaller lens barrel at lower costs.

What is claimed is:

1. A position detecting device, comprising:
    a plurality of magnetoresistive elements which, with a predetermined spacing, are disposed so as to oppose a magnetic recording medium magnetized so as to have N poles and S poles at a predetermined pitch; and
    a holder for holding the magnetoresistive elements,
    the position detecting device detecting a moving amount of the magnetic recording medium by means of the magnetoresistive element,
    wherein the position detecting device further comprises positioning means for adjusting the spacing between the magnetic recording medium and the magnetoresistive elements, and
    wherein the holder is provided so as to be capable of pivoting around a center axis which in substantially parallel to a moving direction of the magnetic recording medium, so as to enable adjustment of the spacing between the magnetic recording medium and the magnetoresistive elements.

2. A position detecting device according to claim 1, wherein;
    the holder comprises a projecting member;
    the projecting member comprises a curved face centered around the center axis; and
    the curved face has substantially a constant curvature.

3. A position detecting device according to claim 1, wherein:
    the holder is attached on a receptacle member; and
    the positioning means comprises:
        an elastic member for applying elastic force to the holder in a direction for causing changes in the spacing; and
        a screw for screwing together the holder and the receptacle member;
        the holder includes an attachment hole for inserting the screw therethrough;
        the receptacle member comprises a screw boss corresponding to the screw,
        the screw is screwed into the screw boss against an elastic force of the elastic member, whereby the spacing between the magnetic recording medium and the magnetoresistive elements is adjusted.

4. A position detecting device according to claim 1, wherein the positioning means is provided on the opposite side of the center axis from the magnetoresistive elements.

5. A position detecting device according to claim 1, wherein:
    the holder comprises a projecting member;
    the projecting member comprises a curved face centered around the center axis; and
    the curved face has a substantially constant curvature;
    the holder is attached on the receptacle member; and
    the positioning means comprises:
        an elastic member for applying elastic force to the holder in a direction for causing changes in the spacing; and
        a screw for screwing together the holder and the receptacle member;
    wherein the holder comprises an attachment hole for inserting the screw therethrough;
    the receptacle member comprises an abutment surface which is substantially parallel to the moving direction of the magnetic recording medium; and
    the elastic member is provided in a position shifted from the attachment hole toward the center axis, so that a moment for pressing the curved face against the abutment surface is generated.

6. A lens barrel, comprising:
    a barrel;
    a guide axis supported by the barrel;
    a plurality of moving lens which move along the optical axis direction along the guide axis;
    lens holding means for holding the moving lens, the lens holding means being provided so as to movable in an optical axis direction along the guide axis; and driving means for driving the lens holding means along the optical axis direction, wherein:
the lens holding means comprises a magnetic recording medium which is magnetized so as to have N poles and S poles at a predetermined pitch; and
the lens barrel further comprises a position detecting device for detecting the moving amount of the magnetic recording medium;

the position detecting device comprises:
a plurality of magnetoresistive elements which, with a predetermined spacing, are disposed so as to oppose a magnetic recording medium;
a holder for holding the magnetoresistive elements; and
positioning means for adjusting the spacing between the magnetic recording medium and the magnetoresistive elements,
wherein the holder is attached so as to be capable of pivoting around a center axis which is substantially parallel to a moving direction of the magnetic recording medium, so as to enable adjustment of the spacing between the magnetic recording medium and the magnetoresistive elements.

7. A lens barrel according to claim 6, wherein:
the holder is attached to the barrel; and
the positioning means comprises:
an elastic member for applying an elastic force to the holder in a direction for causing changes in the spacing; and
a screw for screwing together the holder and the receptacle member; and
wherein the holder comprises an attachment hole for inserting the screw therethrough;
the barrel comprises a screw boss corresponding to the screw, and
wherein:
the lens holding means comprises a reinforced projecting member having an escape hole; and
the escape hole is formed so that the screw boss and the lens holding means do not interfere with each other.

* * * * *

UNITED STATES PATENT AND TRADEMARK OFFICE
CERTIFICATE OF CORRECTION

PATENT NO. : 6,324,023 B1
DATED : November 27, 2001
INVENTOR(S) : Nagaoka et al.

It is certified that error appears in the above-identified patent and that said Letters Patent is hereby corrected as shown below:

<u>Column 18,</u>
Line 6, of the Letters Patent, please delete "in" and insert -- is --.

Signed and Sealed this

Twenty-first Day of May, 2002

Attest:

Attesting Officer

JAMES E. ROGAN
*Director of the United States Patent and Trademark Office*